United States Patent [19]

Struble

[11] Patent Number: 4,731,935

[45] Date of Patent: Mar. 22, 1988

[54] CONTOUR AND OUTLINE TRANSDUCER GAGE ASSEMBLY

[76] Inventor: James E. Struble, 81 W. Newman Rd., Williamston, Mich. 48895

[21] Appl. No.: 919,135

[22] Filed: Oct. 15, 1986

[51] Int. Cl.[4] .............................. G01B 7/02; G01B 7/28
[52] U.S. Cl. ..................................... 33/561; 33/172 E; 33/546; 33/560
[58] Field of Search ................. 33/169 R, 172 E, 545, 33/546, 557, 558, 559, 560, 561, 572

[56] References Cited

U.S. PATENT DOCUMENTS

| | | | |
|---|---|---|---|
| 3,382,582 | 5/1968 | Matson | 33/572 |
| 3,481,042 | 12/1969 | Lemelson | 33/174 |
| 3,501,943 | 3/1970 | Kelling et al. | 73/37.5 |
| 3,520,063 | 7/1970 | Rethwish et al. | 33/169 |
| 3,670,421 | 6/1972 | Kiewicz et al. | 33/561 |
| 3,744,139 | 7/1973 | Bibl | 33/174 P |
| 3,940,854 | 3/1976 | Maxey | 33/174 L |
| 3,958,338 | 5/1976 | Anichini | 33/178 E |
| 3,979,835 | 9/1976 | Sumption et al. | 33/172 E |
| 3,990,153 | 11/1976 | Calame | 33/172 E |
| 4,064,633 | 12/1977 | Wertepny | 33/174 E |
| 4,110,611 | 8/1978 | Tann et al. | 33/559 |
| 4,289,382 | 9/1981 | Clark | 33/172 E |
| 4,424,630 | 1/1984 | Aceti | 33/174 L |
| 4,447,958 | 5/1984 | Tanaka | 33/174 L |
| 4,451,987 | 6/1984 | Cusack | 33/174 L |
| 4,640,014 | 2/1987 | Thomas | 33/143 L |
| 4,658,510 | 4/1987 | Zanier | 33/172 E |

Primary Examiner—Richard R. Stearns
Attorney, Agent, or Firm—Miller, Morriss and Pappas

[57] ABSTRACT

A contour and outline transducer gage assembly for selectively making outline (gap) and contour checks of parts positioned proximate thereto is provided with a slidably movable carrier arm within the gage housing in selective spring biased operative engagement with a linear potentiometer fixedly provided within the gage housing. Selective movement of the carrier arm in relation to the linear potentiometer causes a gaging electrical signal to be generated for read-out on associated data collector means. A movable cover plate is provided externally of the gage housing in fixed actuating engagement with the movable carrier arm. An adjustable contour check pin support assembly is provided on the movable cover plate so as to provide selective horizontal, vertical and angularity adjustment of a part-engaging contour check pin mounted on the contour check pin support assembly. The contour check pin is thus adapted to make selective adjustable gaging contact with a part proximate thereto so as to cause corresponding gaging movement of the carrier arm in relation to the fixed linear potentiometer.

1 Claim, 89 Drawing Figures

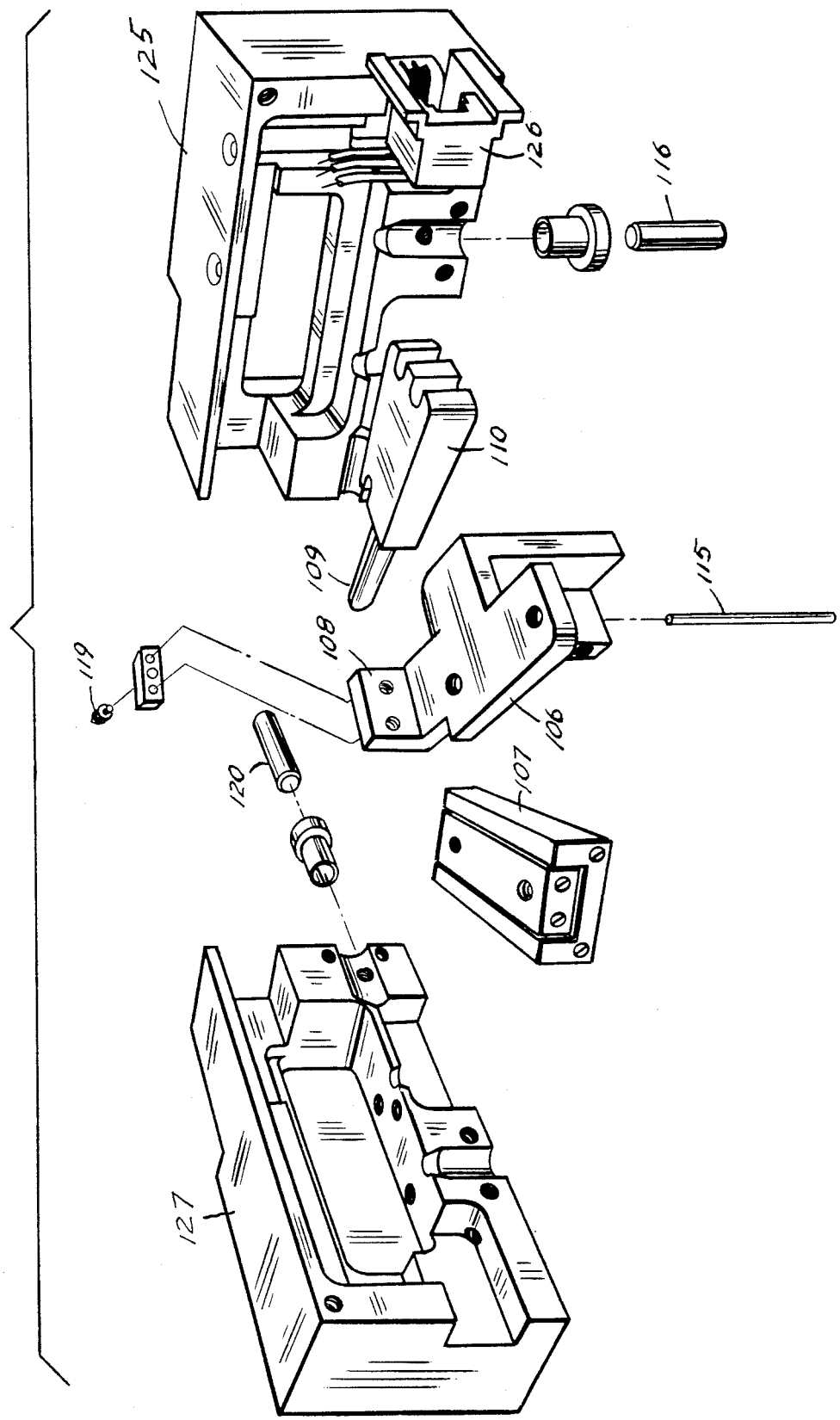

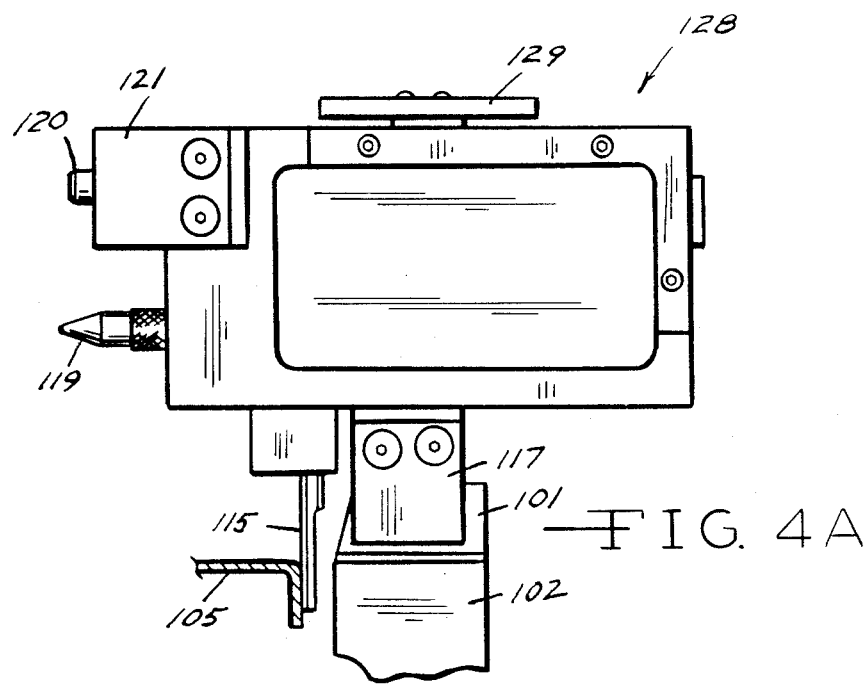
FIG. 4A
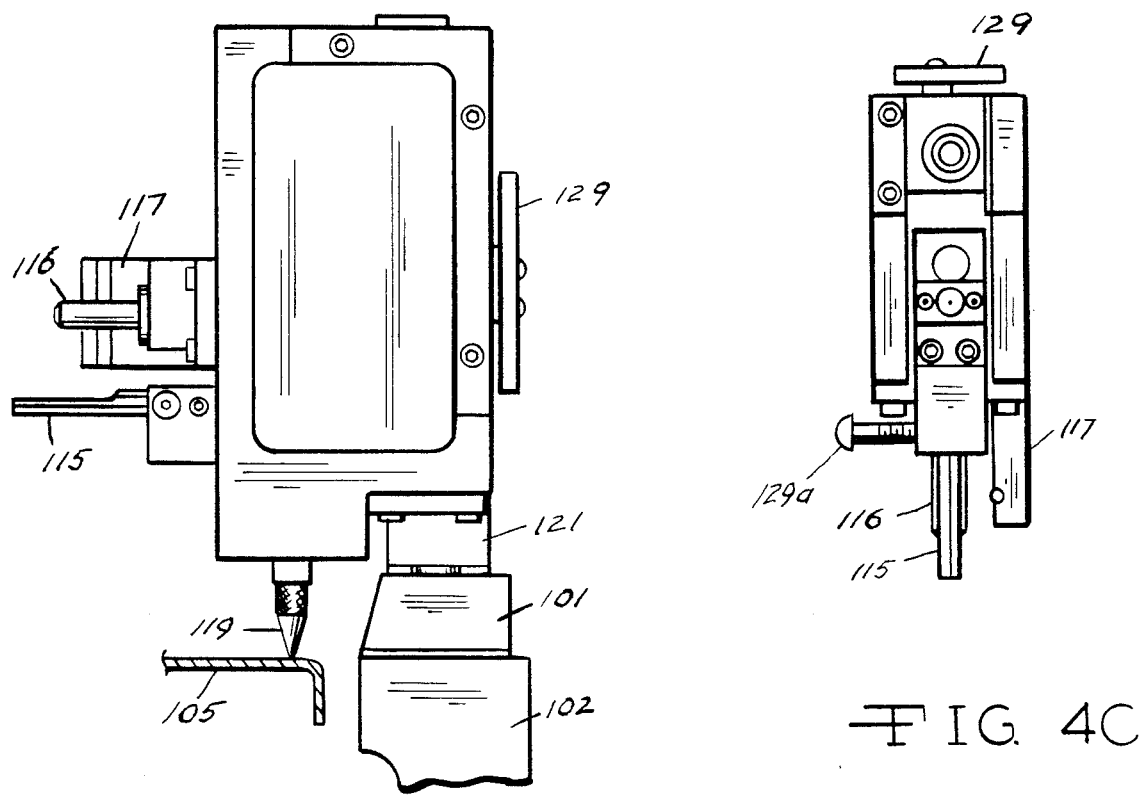
FIG. 4B
FIG. 4C

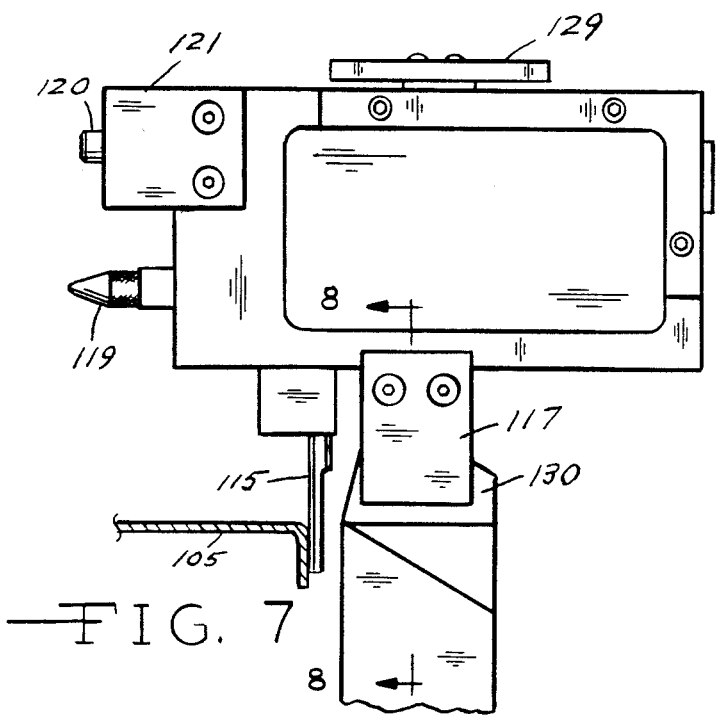
FIG. 7
FIG. 8
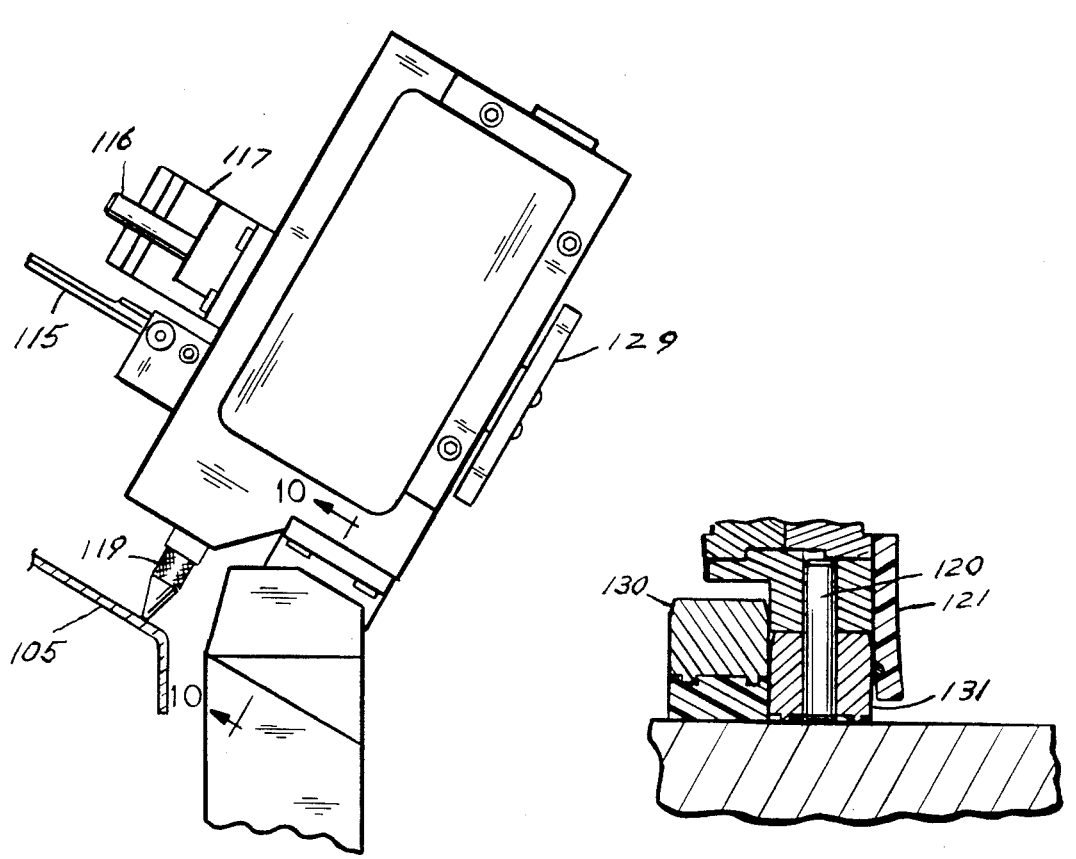
FIG. 9
FIG. 10

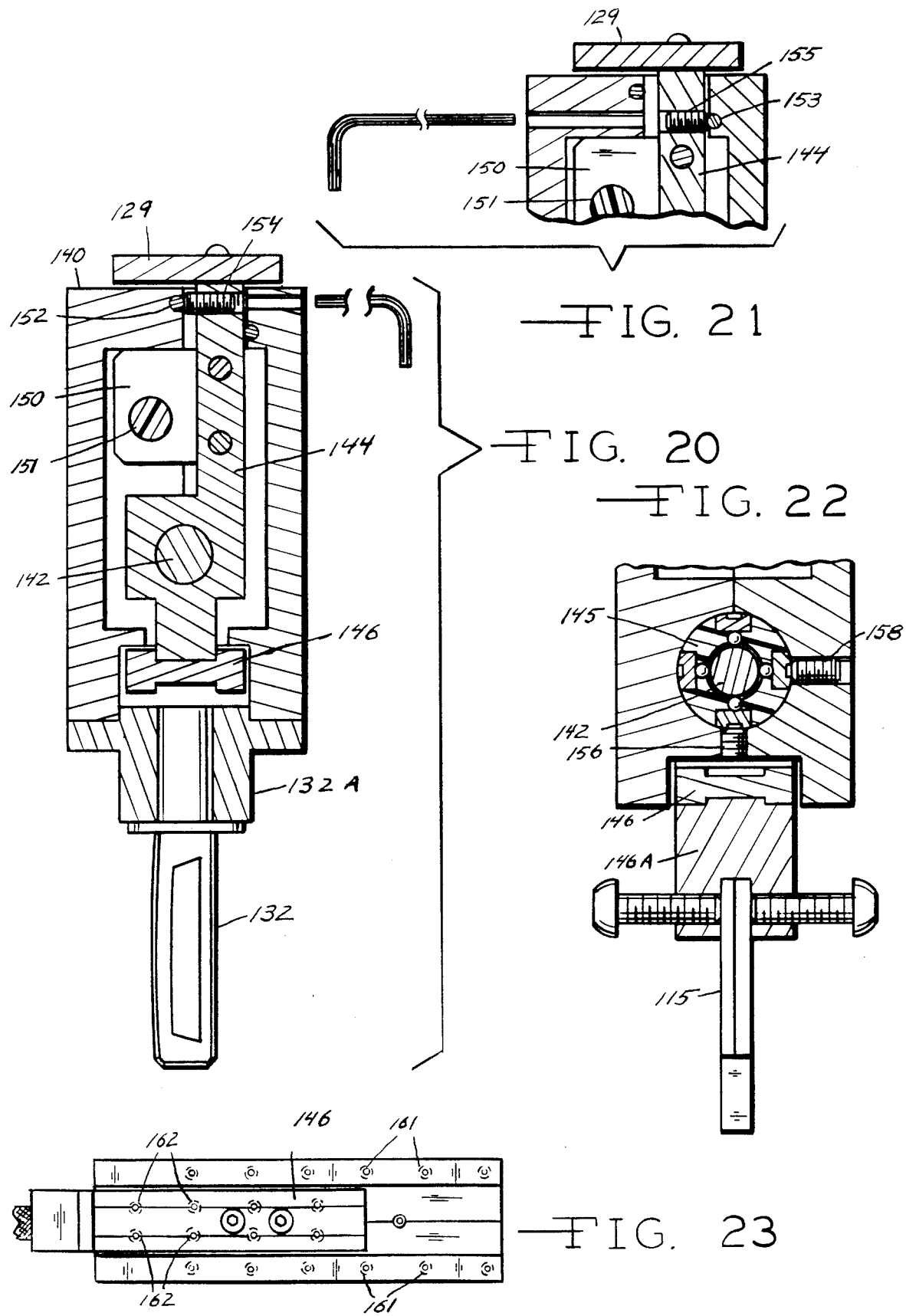

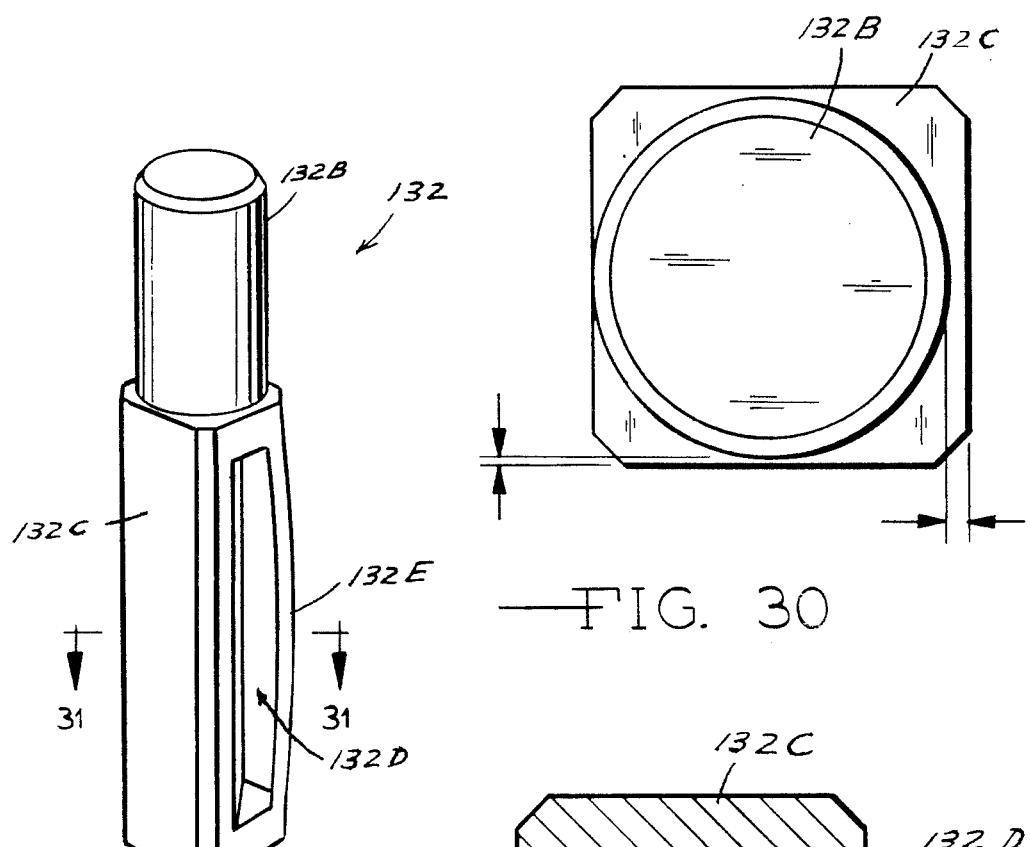
FIG. 29
FIG. 30
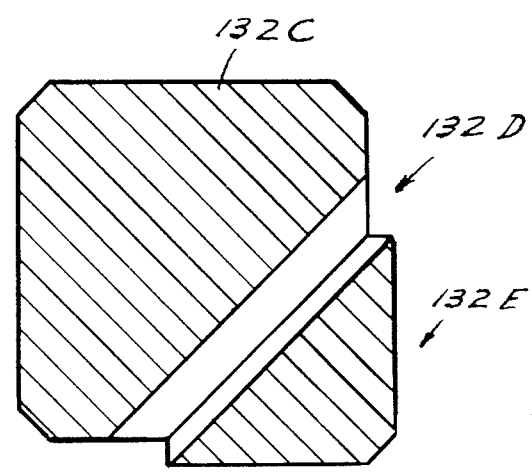
FIG. 31
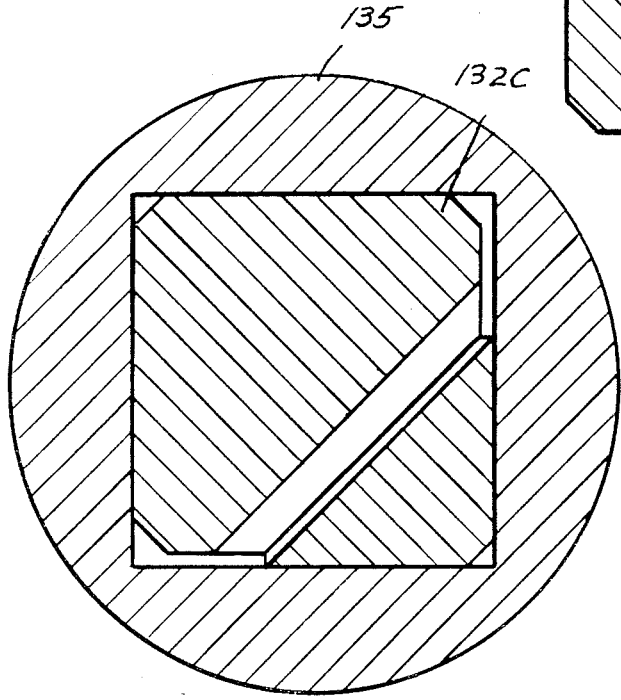
FIG. 31A

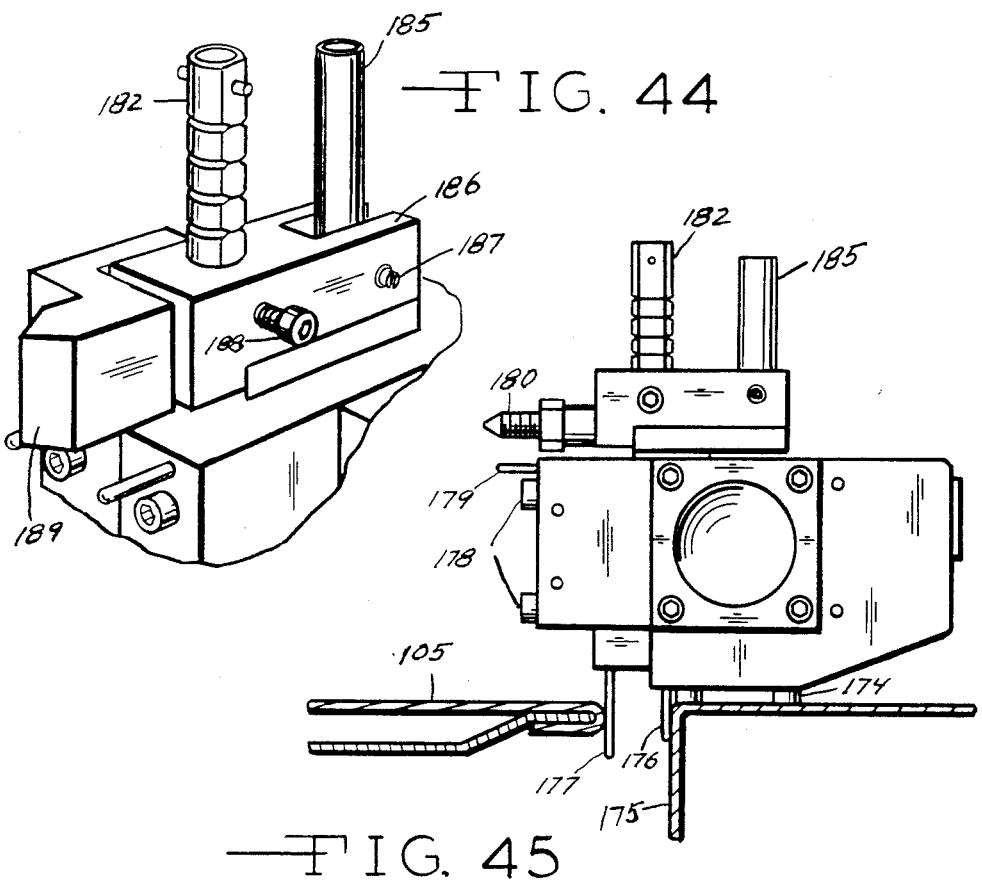
FIG. 44
FIG. 45
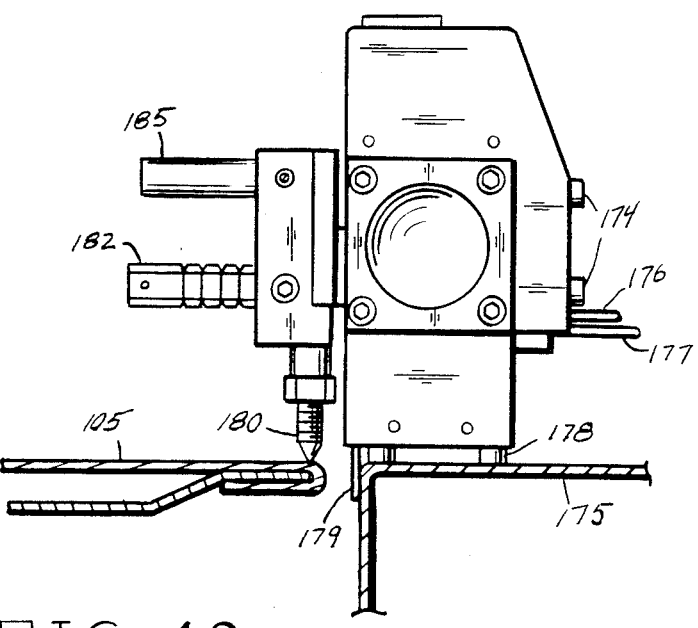
FIG. 46

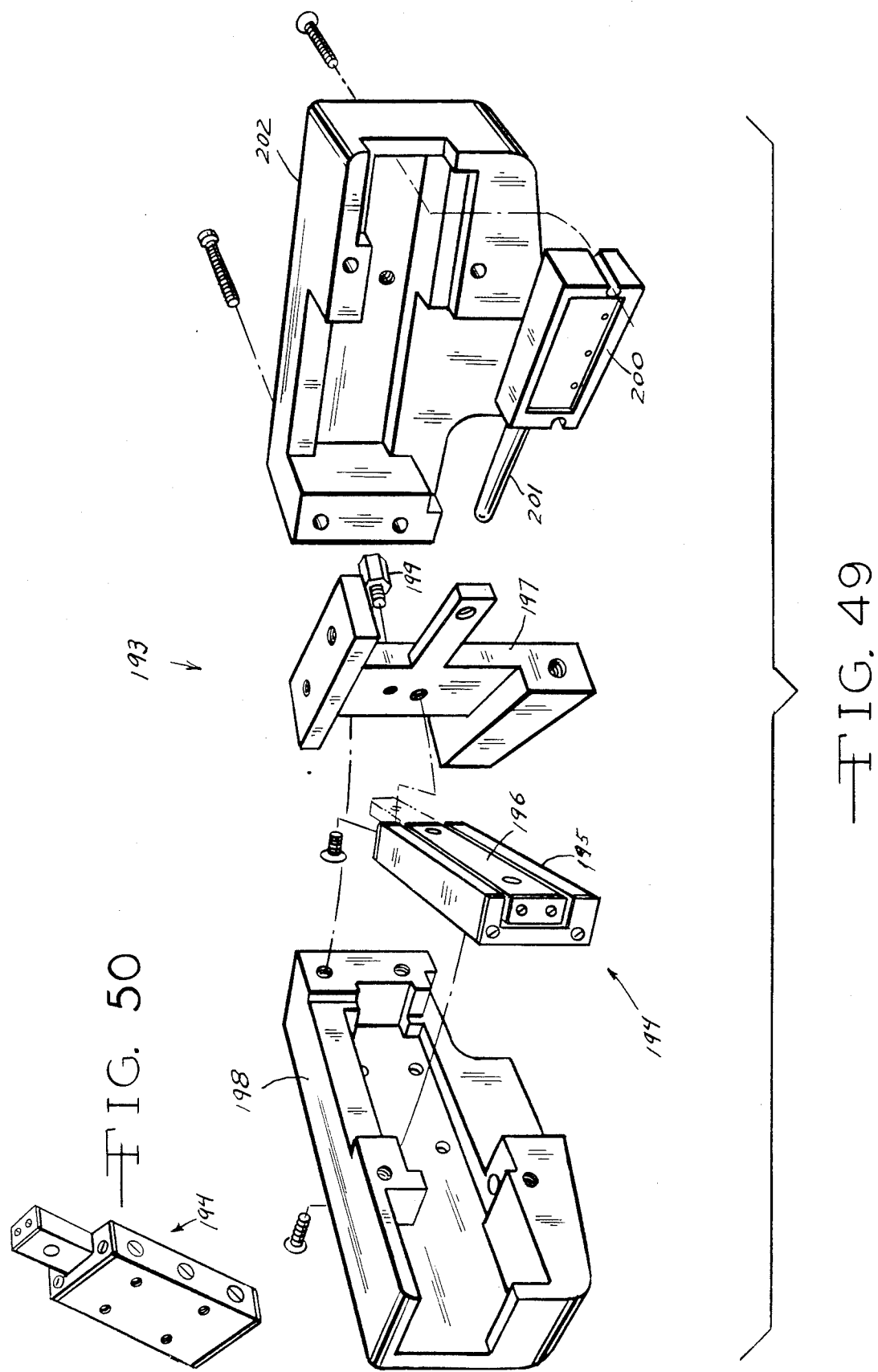

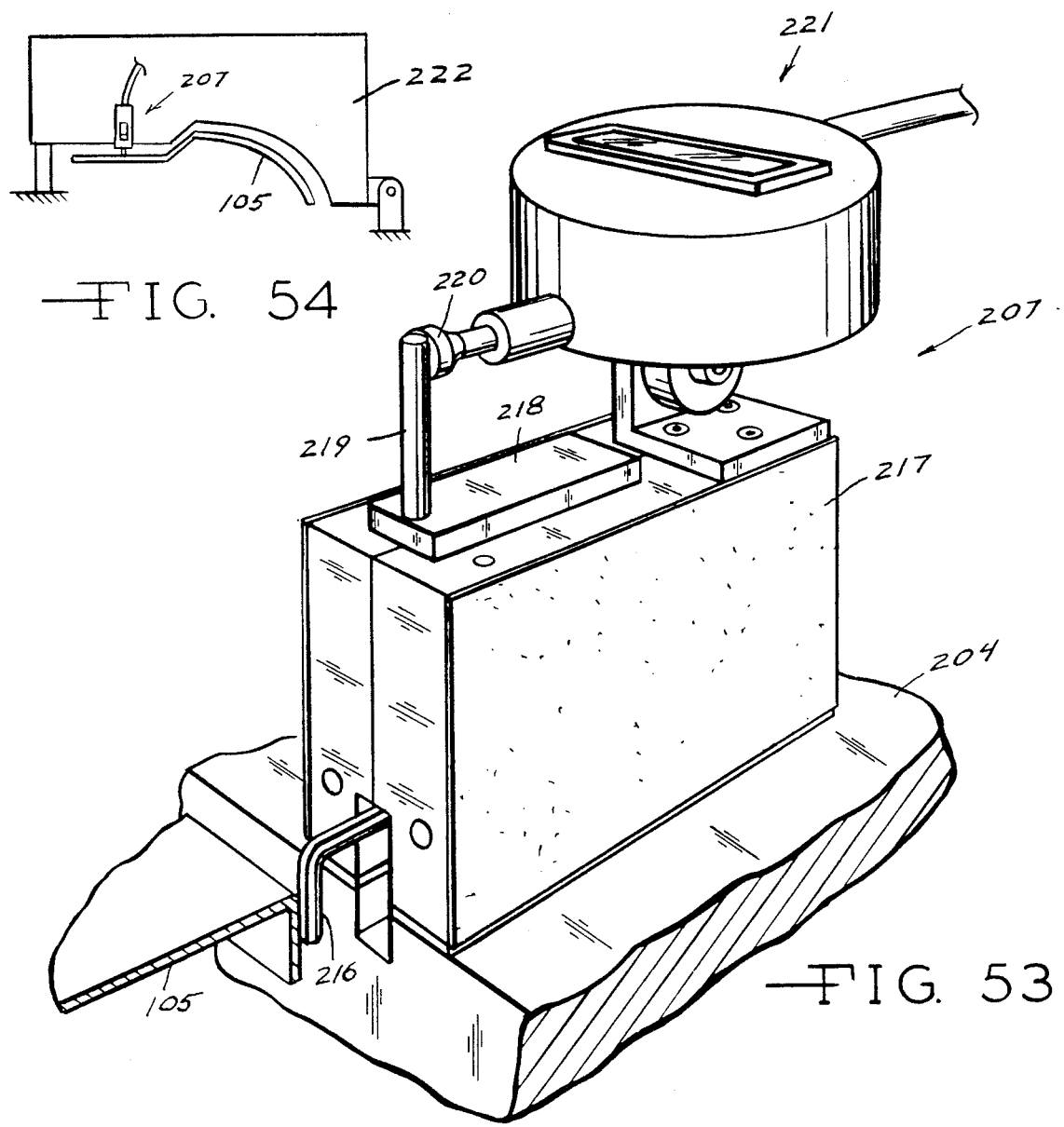
FIG. 54
FIG. 53
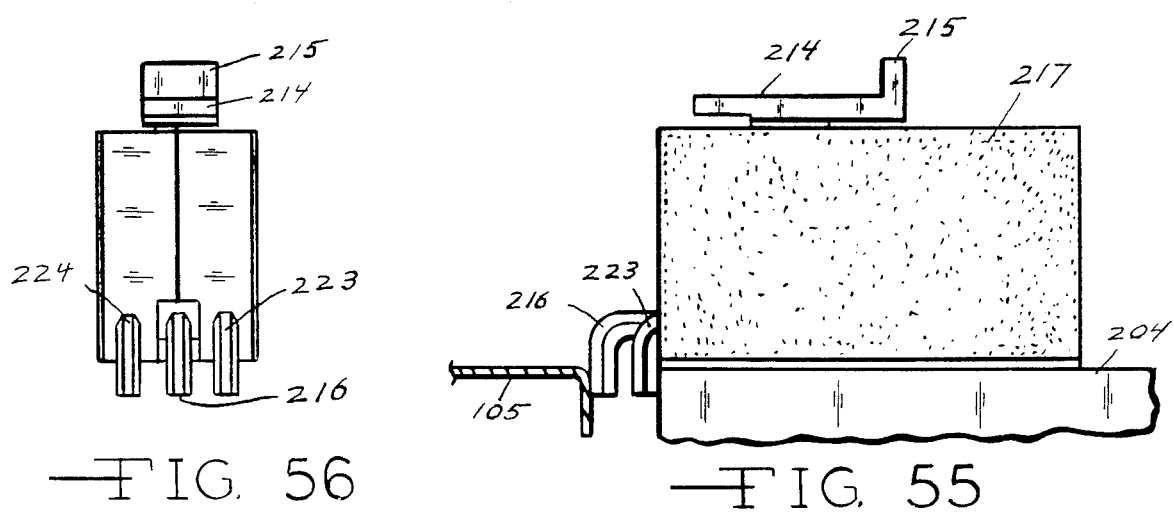
FIG. 56
FIG. 55

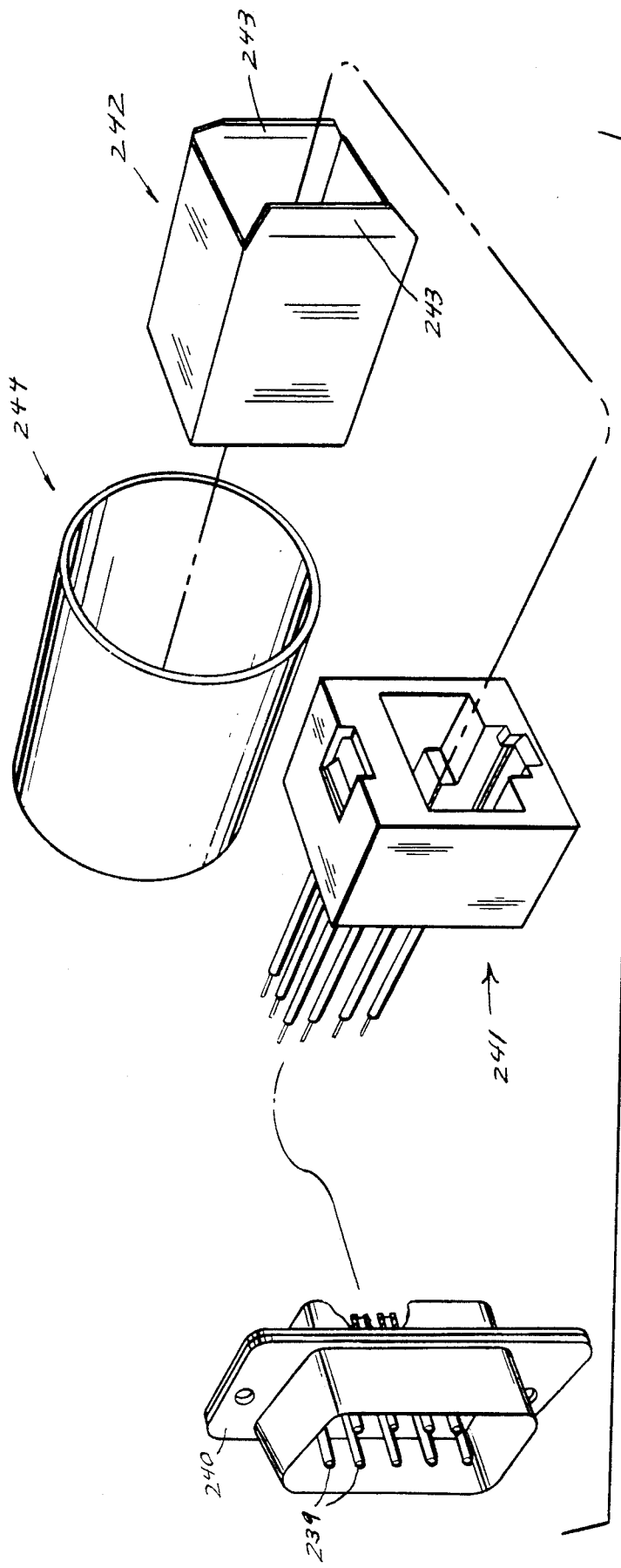
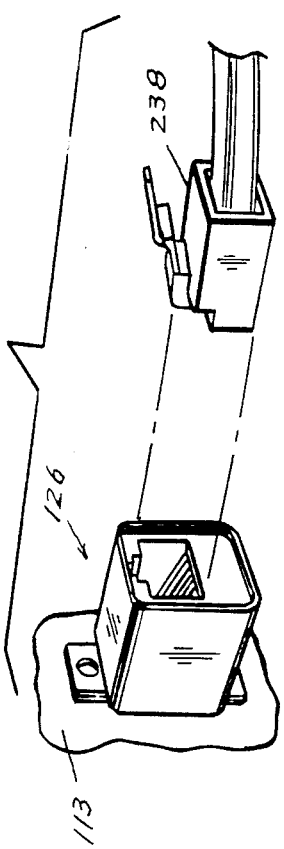
FIG. 63
FIG. 64
FIG. 65

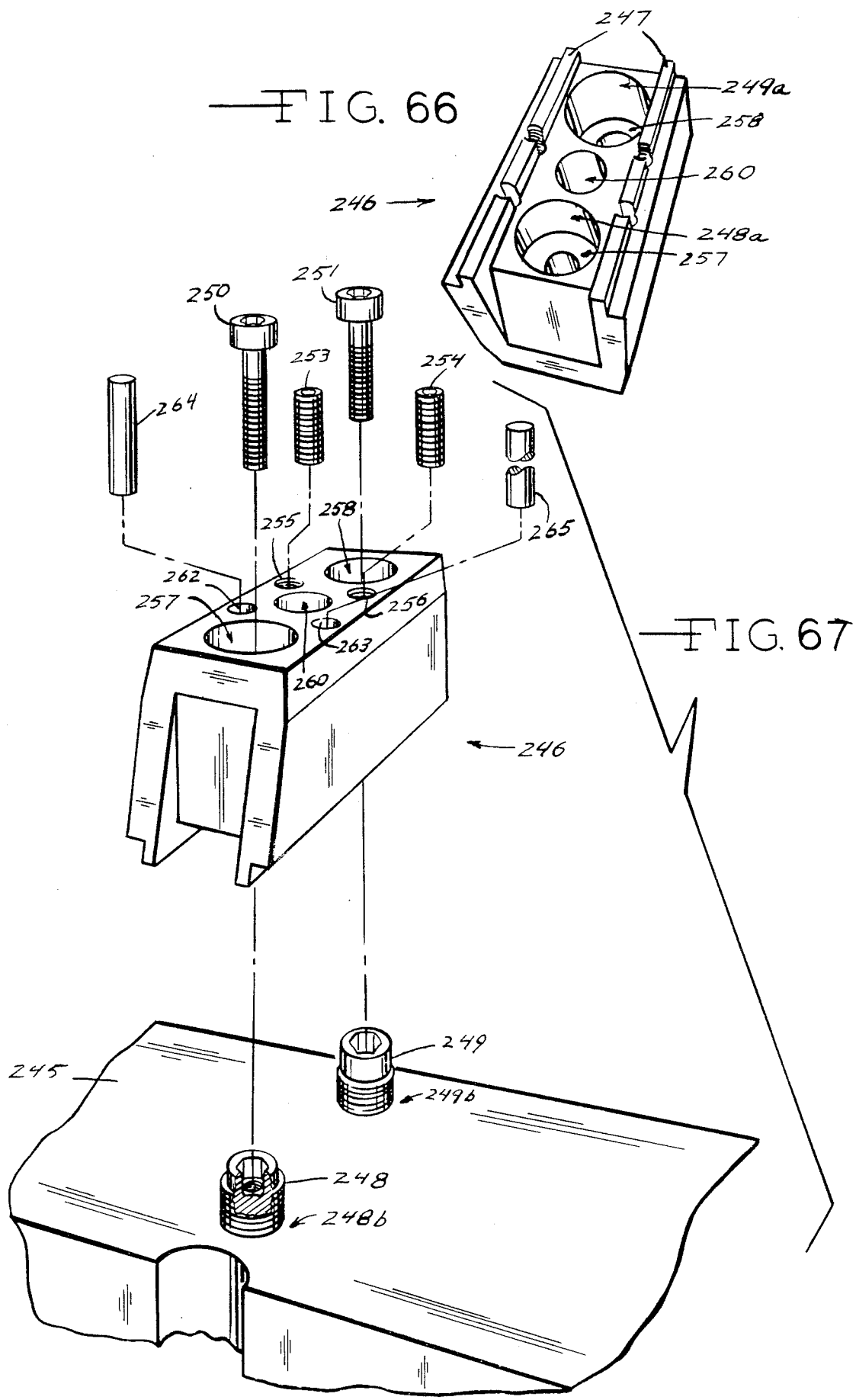

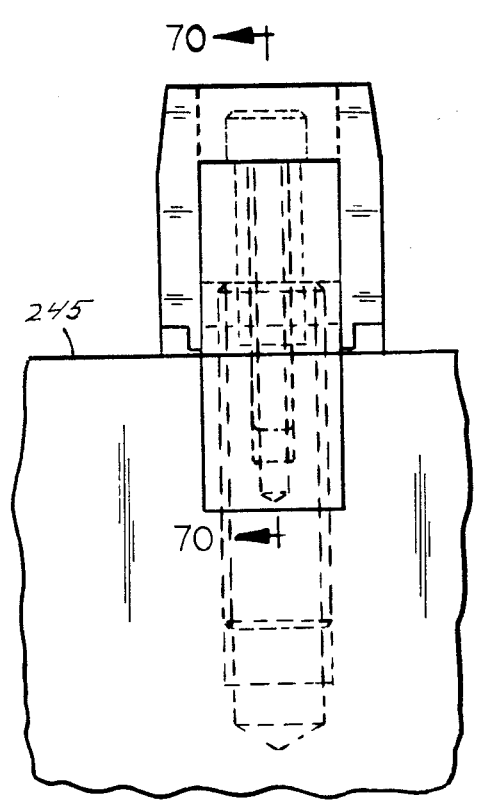
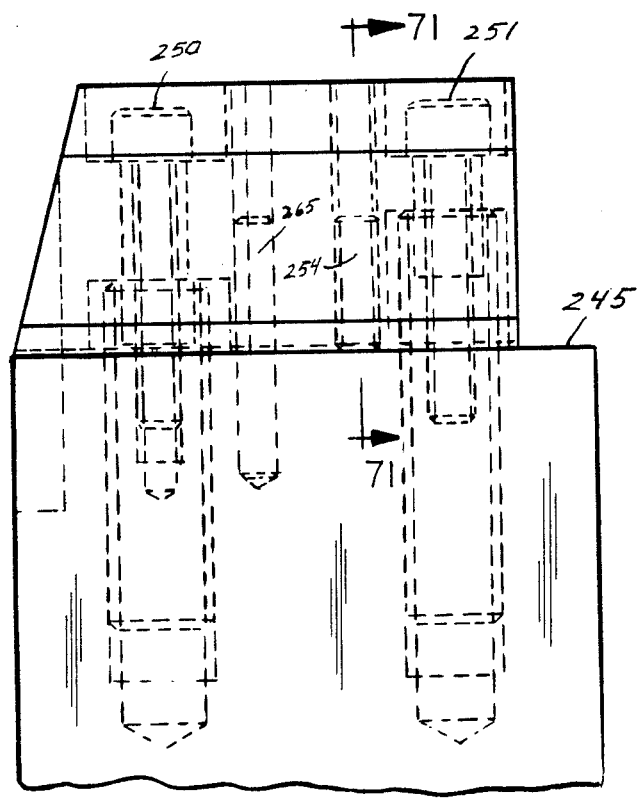
FIG. 68
FIG. 69
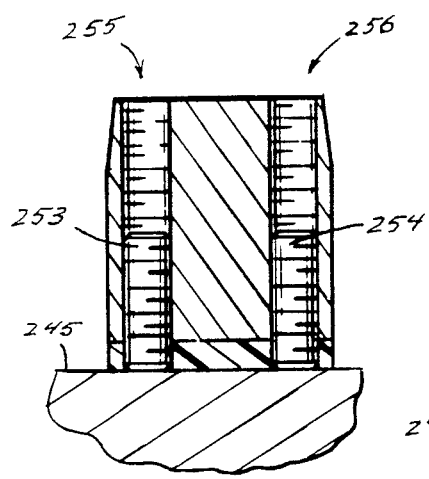
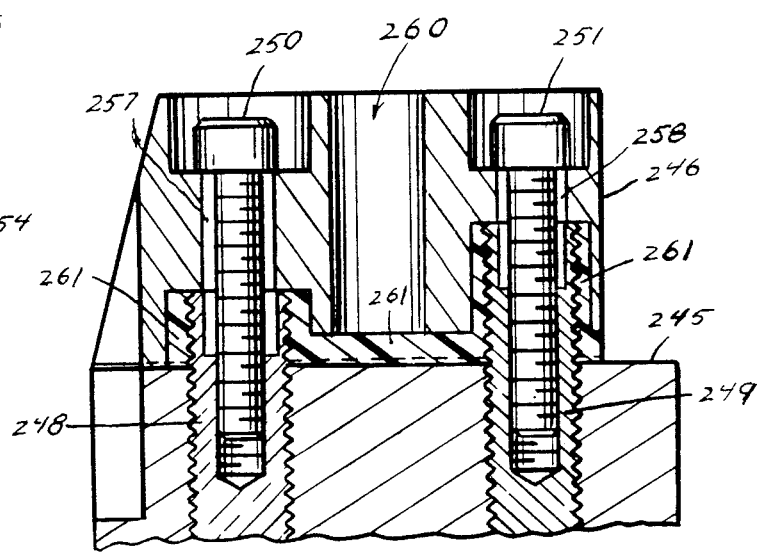
FIG. 71
FIG. 70

CONTOUR AND OUTLINE TRANSDUCER GAGE ASSEMBLY

This invention relates to a contour and outline transducer gage assembly for selectively taking a contour (flush) or an outline (gap) measurement reading from a single bushing location.

Further, this invention relates to a contour and outline transducer gage assembly which is selectively provided with spring biased locating shafts which result in improved repeatability of measurements taken.

Still further, this invention relates to a contour and outline transducer gage assembly which is provided with edge finder pins which are adapted to engage a fixture rail and a retractable spring biased outline finger for selectively measuring gaps and contour outlines.

This invention also relates to a modified contour and outline transducer gage assembly which includes various types of surface mount bushing systems selectively provided on a fixture rail for selectively making gap and outline measurements.

This invention also relates to a modified hand-held contour and outline transducer gage assembly which is provided with a retractable spring biased probe transducer having a hardened shaft extension for selectively measuring depth of holes and surfaces underneath the bushing.

This invention also relates to a contour and outline transducer gage provided with a spring peg locator mounting assembly for selectively making snap engagement with a fixture rail.

This invention also relates to a contour and outline transducer gage receiving fixture rail mount block which can be selectively mounted upon a fixture rail with a selective yaw, roll and pitch adjustment capability during installation upon the fixture rail.

It should be noted that there generally is a direct relationship between the cost of locating a transducer onto a fixture and its ability to make accurate measurements. This invention provides absolute dimensional accuracy without an expensive and/or complicated ancillary locating assembly.

None of the gage devices of the prior known art teach a precision transducer gage which provides the accuracy and repeatability of measurements taken such as is provided by the contour and outline transducer gage assembly.

A need has therefore existed for a contour and outline transducer gage assembly which provides precision, accuracy and repeatability of measurements taken while making contour and outline checks.

It is therefore an object of this invention to provide a contour and outline transducer gage assembly for selectively taking a contour or an outline measurement reading from a bushing location on a fixture rail.

Another object of this invention is to provide a contour and outline transducer gage assembly which provides precision, accuracy and repeatability of measurements taken while making contour and outline checks.

Yet another object of this invention is to provide a contour and outline transducer gage which is used in conjunction with an associated interface control unit and data collector.

A still further object of this invention is to provide a modified probe transducer gage for selectively measuring depth of holes and surfaces underneath a bushing mounted on a fixture rail.

Another object of this invention is to provide a modified contour and outline transducer gage provided with a spring peg locator mounting assembly for selectively making snap engagement with a fixture rail.

Yet another object of this invention is to provide a contour and outline transducer gage receiving fixture rail mount block which can be selectively mounted upon a fixture rail with a selective yaw, roll and pitch adjustment capability during installation upon the fixture rail.

Other objects and advantages found in the construction of the invention will be apparent from a consideration in connection with the appended claims and the accompanying drawings.

In the drawings

FIG. 3 is an exploded perspective view of the contour and outline transducer gage assembly showing the linear potentiometer, the carrier arm, and ball slide assembly.

FIG. 4A is a schematic side elevational view showing the contour and outline transducer gage assembly having a flexible plastic gap check locking clamp selectively mounted in a fixture rail bushing for making a gap check.

FIG. 4B is a schematic side elevational view showing the contour and outline transducer gage assembly having a flexible plastic contour check locking clamp selectively mounted in a fixture rail bushing for making a contour check.

FIG. 4C is a schematic front elevational view showing the contour and outline transducer gage assembly showing the in-line round mounting peg and flexible plastic gap check locking clamp spaced apart therefrom.

FIG. 7 is a schematic side elevational view showing the contour and outline transducer gage assembly selectively mounted on another type of fixture rail bushing positioned for making a gap check.

FIG. 8 is a partial sectional view taken on line 8—8 of FIG. 7 showing the dual bushing mounting assembly.

FIG. 9 is a schematic side elevational view showing the transducer of FIG. 7 positioned on a fixture rail bushing for making a contour check.

FIG. 10 is a partial sectional view taken on line 10—10 of FIG. 9 showing the dual bushing mounting assembly.

FIG. 20 is a sectional view taken on line 20—20 of FIG. 13 showing the carrier arm assembly.

FIG. 21 is a partial sectional view taken on line 21—21 of FIG. 13 showing the cover plate attached to the carrier arm.

FIG. 22 is a partial sectional view taken on line 22—22 of FIG. 13 showing the front bushing assembly.

FIG. 23 is a bottom view of the transducer showing the square peg assembly mounting holes provided therein.

FIG. 29 is a perspective view of the square locator peg showing the longitudinally oriented spring bias expander slot therethrough.

FIG. 30 is a top view of an offset square peg.

FIG. 31 is a sectional view taken on line 31—31 of FIG. 29.

FIG. 31A is a schematic sectional view showing the square peg mounted in its in situ use position in a fixture rail bushing.

FIG. 44 is a partial perspective view of another embodiment of the transducer gage contour line contact pin.

FIG. 45 is a side elevational view of the hand held transducer gage of FIG. 40 positioned to make a gap check.

FIG. 46 is a side elevational view of the hand held transducer gage of FIG. 40 positioned to make a contour check.

FIG. 49 is an exploded perspective view of the interior of the hand held transducer shown in FIG. 40.

FIG. 50 is a perspective view of the linear ball bearing assembly.

FIG. 53 is a perspective view of the transducer shown in FIG. 51 as modified to include an associated electronic read-out indicator.

FIG. 54 is a schematic elevational view of the transducer of FIG. 51 provided on a pivotally mounted checking fixture so as to selectively make a contour check of a fender.

FIG. 55 is a schematic side elevational view of another embodiment of the hand held transducer gage showing the use of fixture rail edge contact pins to maintain the transducer in its in situ use position for making a gap check.

FIG. 56 is a front elevational view of hand held transducer gage shown in FIG. 55.

FIG. 63 is an exploded schematic perspective view of the converter plug utilized to interface a standard telephone plug to a computer readout unit.

FIG. 64 is a perspective view of the assembled convertor plug.

FIG. 65 is a schematic perspective view showing a standard telephone plug positioned for selective insertion into the convertor plug in operative engagement with the computer readout unit.

FIG. 66 is a bottom perspective view of an adjustable rail mount block used in the fixture rail mount block system.

FIG. 67 is an exploded schematic perspective view showing the various components of the adjustable fixture rail mount block system.

FIG. 68 is a schematic front elevation view showing the transducer rail mount block in its installed in situ use position on a fixture rail.

FIG. 69 is a schematic side elevation view showing the transducer rail mount block in its installed in situ use position on a fixture rail.

FIG. 70 is a partial sectional view taken on line 70—70 of FIG. 68.

FIG. 71 is a partial sectional view taken on line 71—71 of FIG. 69.

DESCRIPTION

Figure 1:
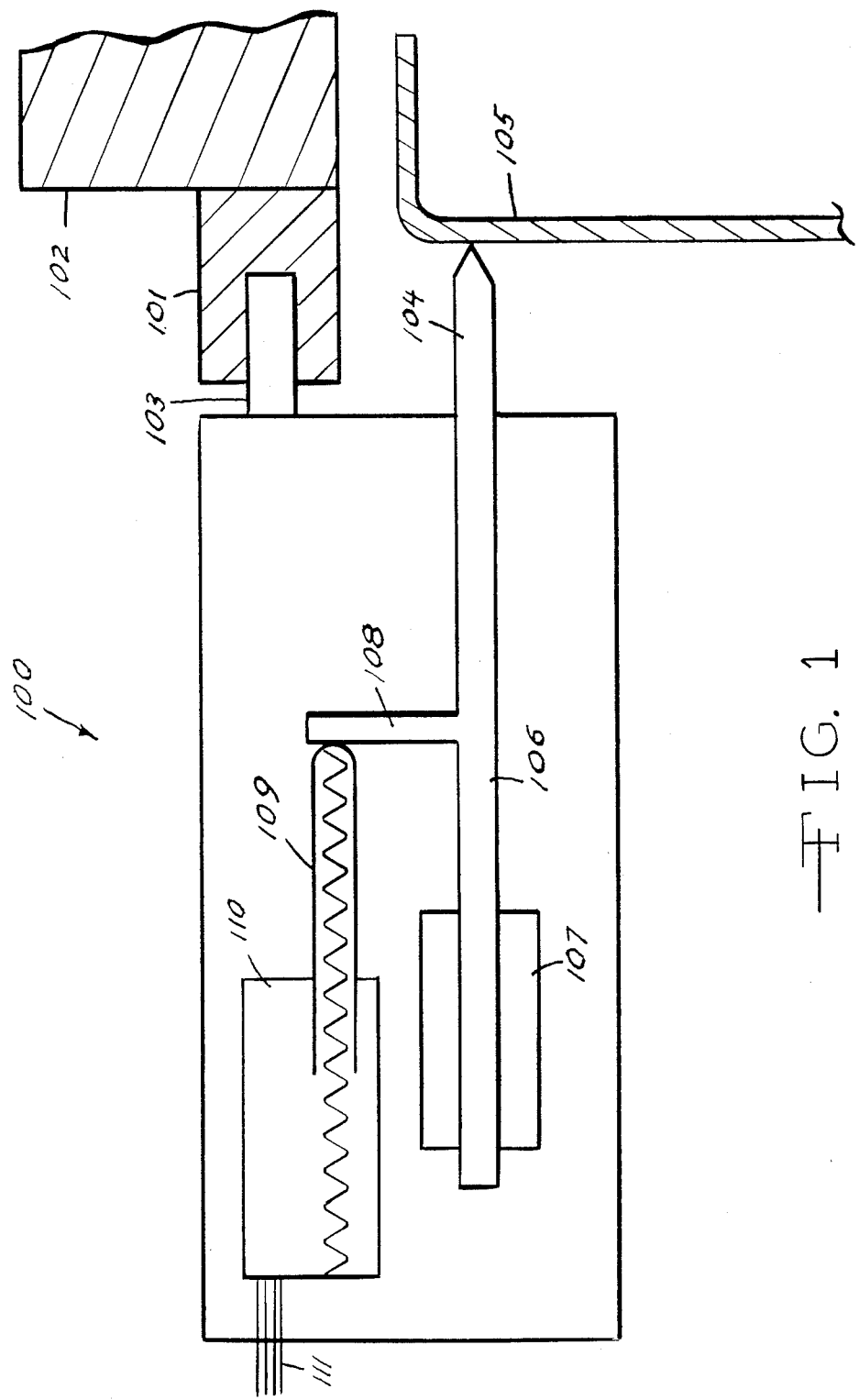
FIG. 1 is a schematic diagram showing an embodiment of the contour and outline transducer gage mounted on a fixture rail so as to make a contour check on an adjacent part.

As shown in the schematic drawing of FIG. 1, an embodiment of the contour and outline transducer gage 100 is shown mounted on the locator bushing 101 provided on the fixture rail 102. The contour locator shaft 103 makes snap engagement with the locator bushing 101 so as to maintain the transducer gage 100 in its operative use position. The spring biased contour check pin 104 is retracted so as to contact the part 105. The contour check pin 104 is operatively connected to the spring biased carrier arm 106 which retracts in accordance with the movement of the check pin 104. The carrier arm 106 is slidably mounted on the ball slide assembly 107. An actuator arm 108 extends from the carrier to operatively engage the spring biased potentiometer contact pin 109. The relative movement of the potentiometer contact pin 109 within the potentiometer 110 provides the electronic readout representing the relative positioning of the contour check pin 104 against the part 105. As will be hereinafter discussed, the electronic impulses are transmitted to a data collector readout unit through the connector wires 111. Thus, a contour check or gap check is easily made with repetitive accuracy due to the proper positioning of the transducer 100 on the fixture rail 102.

With the contour and outline transducer gage 100 thus fixedly positioned, an operator-independent reading is selectively taken as will be hereinafter described which is accurate and which does not include operator-induced errors which are normally introduced when the reading is taken while the gage itself is being handled by the operator as is the case in the gage devices of the prior known art.

Further, by thus fixedly positioning the contour and outline gage 100 on the fixture rail 102 with the spring-biased contour check pin 104 automatically positioned against the part 105, it is then possible to selectively take an operatorindependent accurate reading which not only checks the positioning of the part but also the shape of the part itself.

In the gages of the prior art, the gages are generally positioned and/or otherwise handled by the operator while the readings are simultaneously taken or otherwise observed, thereby producing readings which are usually erroneous due to faulty operator handling techniques.

In contrast, the contour and outline transducer gage assembly 100 of the instant invention is fixedly and accurately positioned on an adjacent fixture rail 102 with its spring-biased contour check pin 104 bearing against the part 105 in its ready reading-taking position. The operator merely presses a remote button to selectively take the reading without touching or otherwise handling the gage 100 itself during the reading taking interval. Thus, an operator-independent reading is taken which is accurate and which checks the positioning as well as the shape of the part being gaged.

Figure 2:
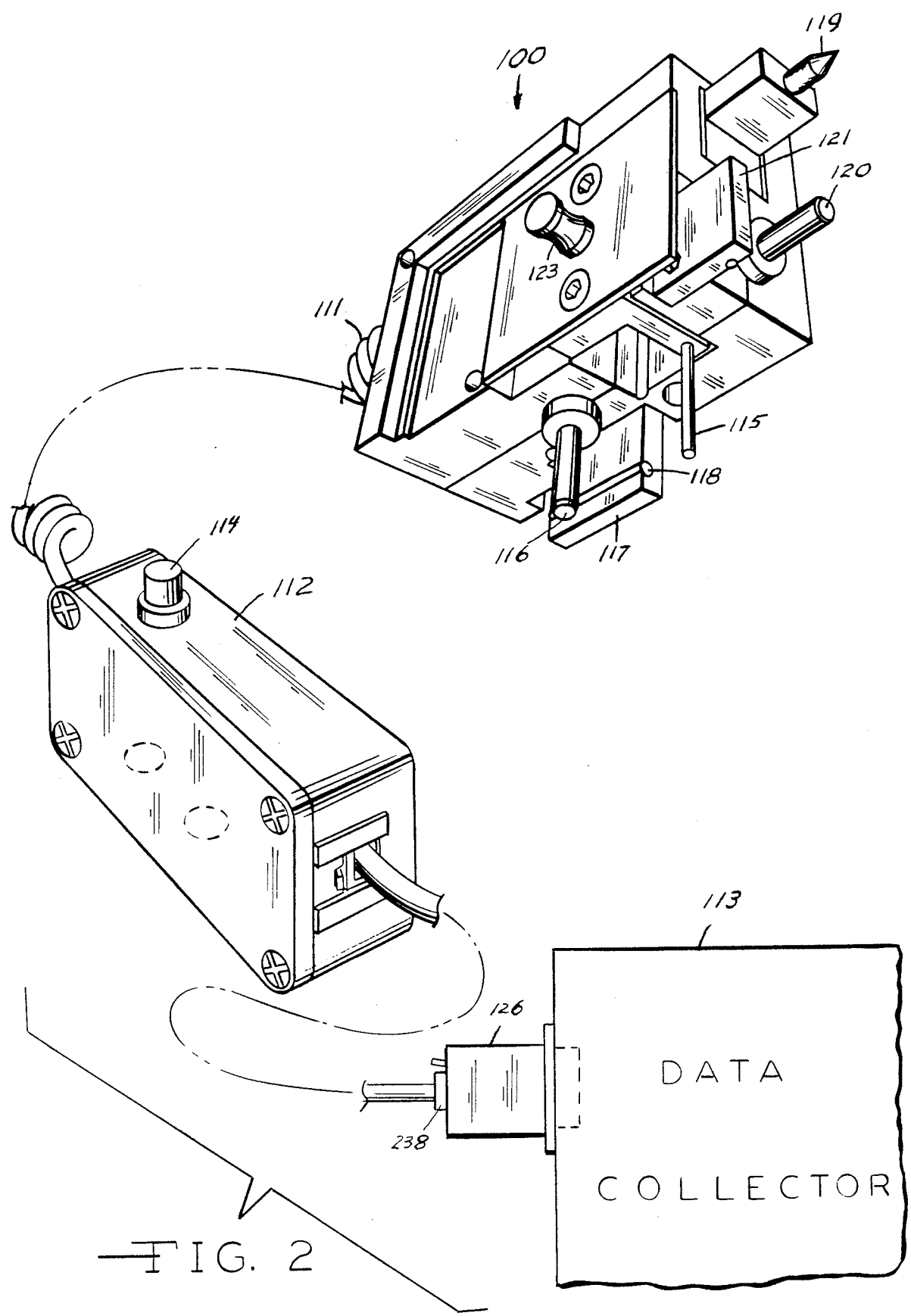
FIG. 2 is a schematic perspective view of an embodiment of the contour and outline transducer gage with an associated interface control unit and data collector.

As shown in FIG. 2, the contour and outline transducer gage 100 is operatively connected to an interface control unit 112 and a data collector 113. The interface control unit 112 and data collector 113 are standard in the art and make it possible to translate the electronic reading taken by the transducer gage 100 into an electronic digital readout displayed by the data collector 113. It should be noted that a reading actuator button 114 is provided on the interface control unit 112 which enables the operator to selectively take a contour or outline gaging reading after the contour and outline transducer gage 100 has been snapped into its operative use gaging position on the fixture rail 102 with the spring-biased sensing or check element 104 automatically in engagement with the part 105. The operator thus does not have to handle or otherwise move the gage 100 while a reading is being taken and therefore an operator-independent reading is obtained with a higher degree of accuracy than has hitherto been possible.

Figure 2A:
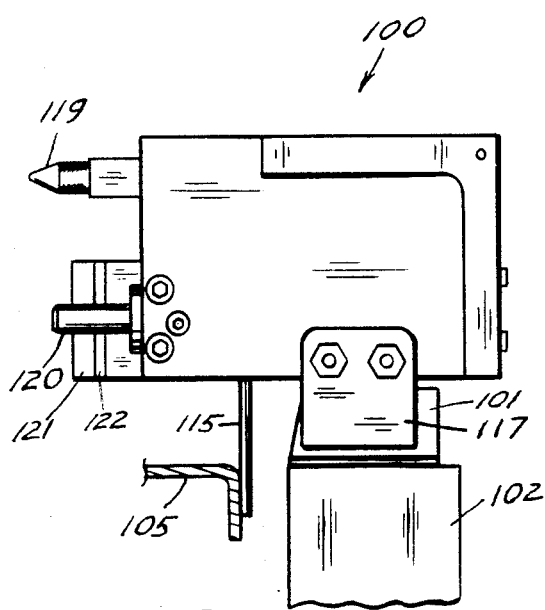
FIG. 2A is a schematic left side elevational view showing the contour and outline gage selectively mounted on a fixture rail bushing for making a gap check.

As shown in FIG. 2A, the contour and outline transducer gage 100 is positioned so as to make an outline (gap) check of a part 105. In making the outline (gap) check, the spring biased outline (gap) check finger 115 of the gage 100 is manually retracted while the outline locator shaft 116 makes positive snap-engagement with the locator bushing 101 fixedly mounted on the fixture rail 102. A flexible plastic biasing outline locking clamp 117 is provided on the gage 100. The outline locking clamp 117 is provided with a transverse steel pin 118 which bears against the side of the locator bushing 101 so as to positively retain the outline locator shaft 116 within the locator bushing 101.

The spring biased outline (gap) check finger 115 is then allowed to extend against the part 105 being checked for proper location. The outline (gap) check reading is then taken by depressing the actuator button 114 located on the interface control unit 112. After the outline (gap) reading has been taken, the contour and outline transducer gage 100 is easily snap-removed from the locator bushing 101.

Figure 2B:
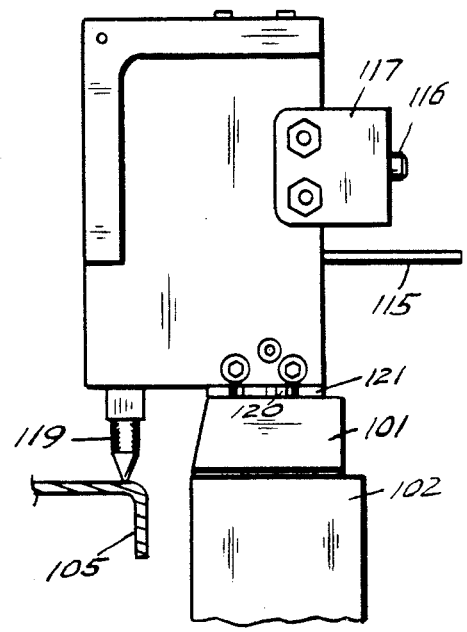
FIG. 2B is a schematic side elevational view showing the contour and outline transducer gage selectively mounted on a fixture rail bushing for making a contour check.

As shown in FIG. 2B, the contour and outline transducer gage 100 is positioned so as to make a contour (flush) check of the part 105. In making the contour (flush) check, the spring biased contour check pin 119 is pushed inwardly into the gage 100 while the contour locator shaft 120 is inserted into locator bushing 101. The contour locator shaft 120 is held in its use position within the locator bushing 101 by the flexible plastic contour locking clamp 121 which is also provided with a steel contact pin 122 which bears against the side of the locator bushing 101.

Figure 2C:
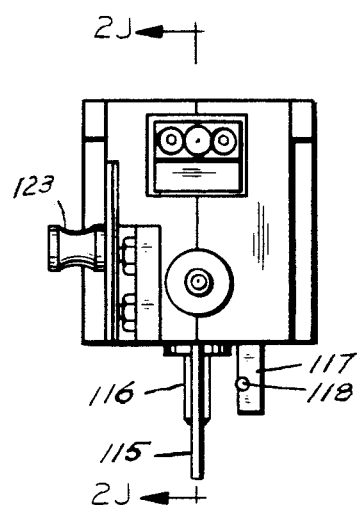
FIG. 2C is a schematic front elevational view of the contour and outline transducer gage showing the downwardly extending offset biasing locking clamp.

The front view of the transducer gage 100 shown in FIG. 2C more clearly indicates the spaced-apart opposed biasing position of the downwardly extending outline (gap) flexible plastic locking clamp 117 in relation to the outline locator shaft 116. It is this biasing interrelationship which permits a positive fixed interlock positioning of the transducer gage 100 on the locator bushing 101 so as to achieve an accurate operator-independent gage reading as described herein. The same fixed clamping capability exists between the contour locator shaft 120 and the flexible plastic contour locking clamp 121 apart therefrom.

As further shown in FIG. 2C, a carrier retractor handle 123 is provided which is attached to the carrier arm 106 so as to facilitate the selective retraction of the outline (gap) check finger 115 and/or the contour check pin 119 mounted thereon when placing the transducer gage 100 in its operative use position as previously described.

Figure 2D:
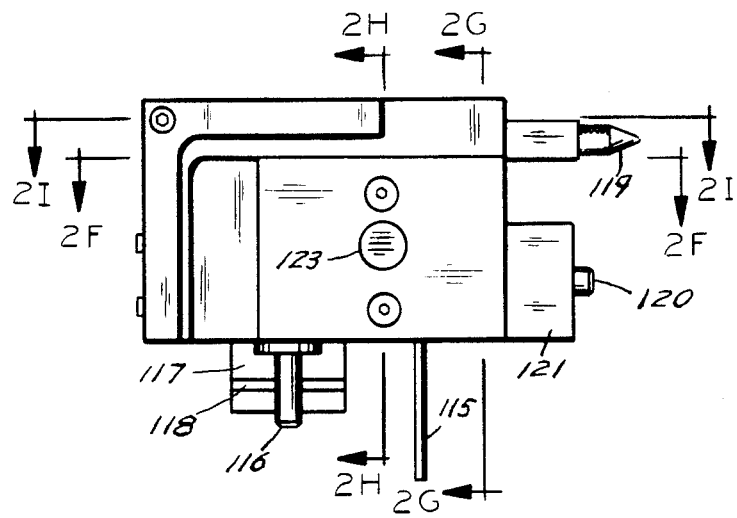
FIG. 2D is a schematic right side elevational view of the contour and outline transducer gage showing the carrier retractor handle.

As shown in the right side elevational view of FIG. 2D, the carrier retractor handle 123 is positioned so as to facilitate the selective retraction of the outline (gap) check pin 115 and the contour check pin 119 as required.

Figure 2E:
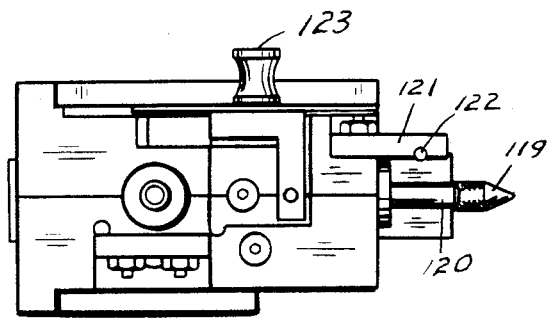
FIG. 2E is a schematic bottom view of the contour and outline transducer gage.

The bottom view of the contour and outline transducer gage 100 as shown in FIG. 2E shows the relative positioning of the carrier retractor handle 123, the outline check pin 115 and the contour check pin 119.

Figure 2F:
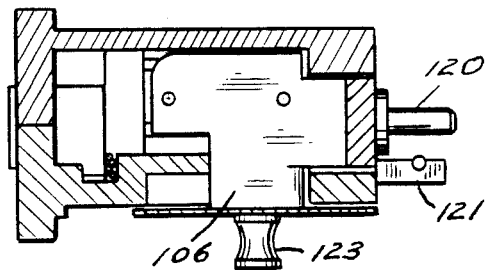
FIG. 2F is a sectional view taken on line 2F—2F of FIG. 2D showing the carrier member.

The sectional view taken on line 2F—2F of FIG. 2D as shown in FIG. 2F shows the top of the carrier arm 106 and the carrier retractor handle 123 attached thereto. In addition, the contour locator shaft 120 is shown in its spaced-apart position from the contour flexible plastic locking clamp 121.

Figure 2G:
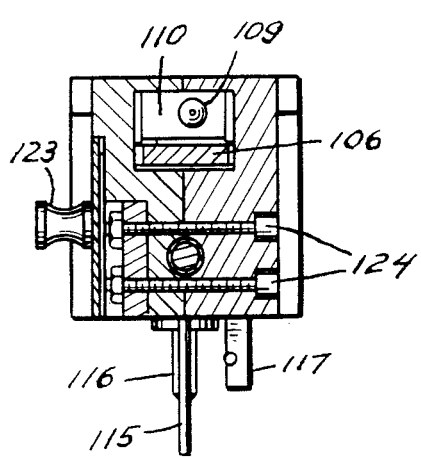
FIG. 2G is a sectional view taken on line 2G—2G of FIG. 2D.

The sectional view taken on line 2G—2G of FIG. 2D as shown in FIG. 2G shows the outline (gap) check pin 115, the outline locator peg 116 and the flexible outline clamp 117 spaced-apart therefrom and the bolts 124 which hold the casing together.

Figure 2H:
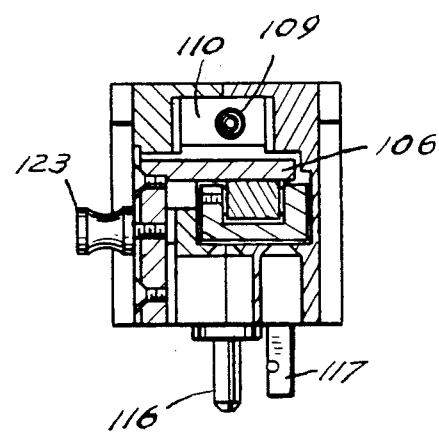
FIG. 2H is a sectional view taken on line 2H—2H of FIG. 2D.

The sectional view taken on line 2H—2H of FIG. 2D as shown in FIG. 2H shows the carrier arm 106 and the linear potentiometer 110.

Figures 2I, 2J:
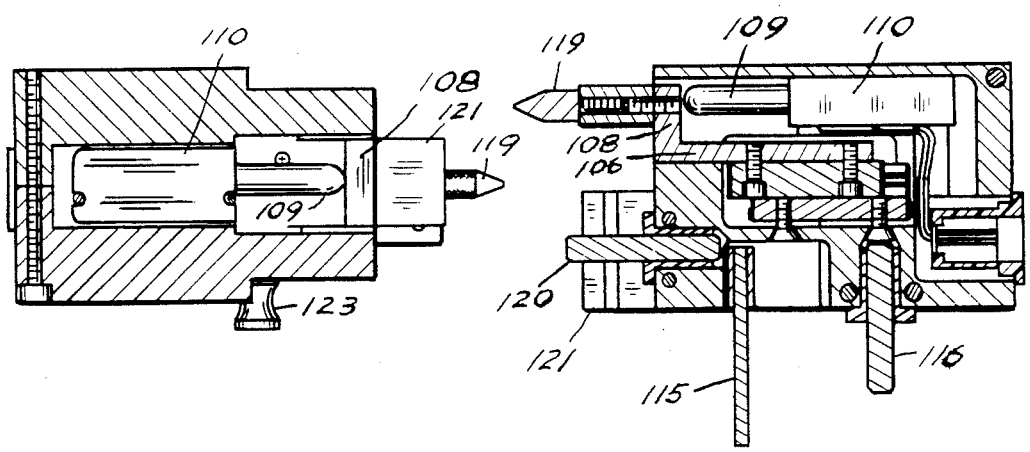
FIG. 2I is a sectional view taken on line 2I—2I of FIG. 2D.
FIG. 2J is a sectional view taken on line 2J—2J of FIG. 2C.

FIG. 2I shows the vertical arm 108 of the carrier 106 acting against the spring-biased linear potentiometer contact pin 109.

The sectional view taken on line 2J—2J of FIG. 2C as shown in FIG. 2J clearly shows the coating relationship of the carrier 106, the linear potentiometer contact pin 109, the outline (gap) check pin 115 and the contour check pin 119 when the contour and outline transducer gage 100 is in its operative use assembled position.

As shown in the exploded perspective view of FIG. 3, the transducer gage right side housing 125 is configured to operatively engage and house the linear potentiometer 110. The linear potentiometer wire read-out connector element 126 is positioned at the rear of the transducer gage 100 so as to selectively receive the cable 111 from the interface control unit 112 as shown in FIG. 2.

The spring biased linear potentiometer contact pin 109 is positioned so as to operatively engage the vertical actuator arm portion 108 of the carrier 106. The contour check pin 119 is adapted for fixed engagement with the vertical actuator arm 108 of the carrier 106 so as to extend outwardly therefrom to the exterior of the assembled transducer gage 100 into its operative use contour check position as shown generally in the drawings.

The outline (gap) check finger 115 is adapted to fixedly engage and extend downwardly from the carrier 106 into its operative use contour check position as shown generally in the drawings.

The outline (gap) check finger 115 is adapted to fixedly engage and extend downwardly from the carrier 106 into its operative use gap check position externally of the assembled transducer gage 100. The ball slide assembly 107 is positioned for slidable engagement with the carrier 106 so as to facilitate its operative use movement in response to selective movement respectively of the contour check pin 119 or of the outline (gap) check finger 115 as herein described.

The transducer gage left side housing 127 engages the right side housing 125 so as to retain the foregoing components of the transducer gage 100 in their respective operative use positions. The contour locator peg 120 and the outline locator peg 116 are fixedly provided on the transducer gage 100 so as to extend outwardly therefrom for selective engagement with the bushing 101 on the fixture rail 102 when the transducer gage 100 is in its operative use position.

Figure 4:
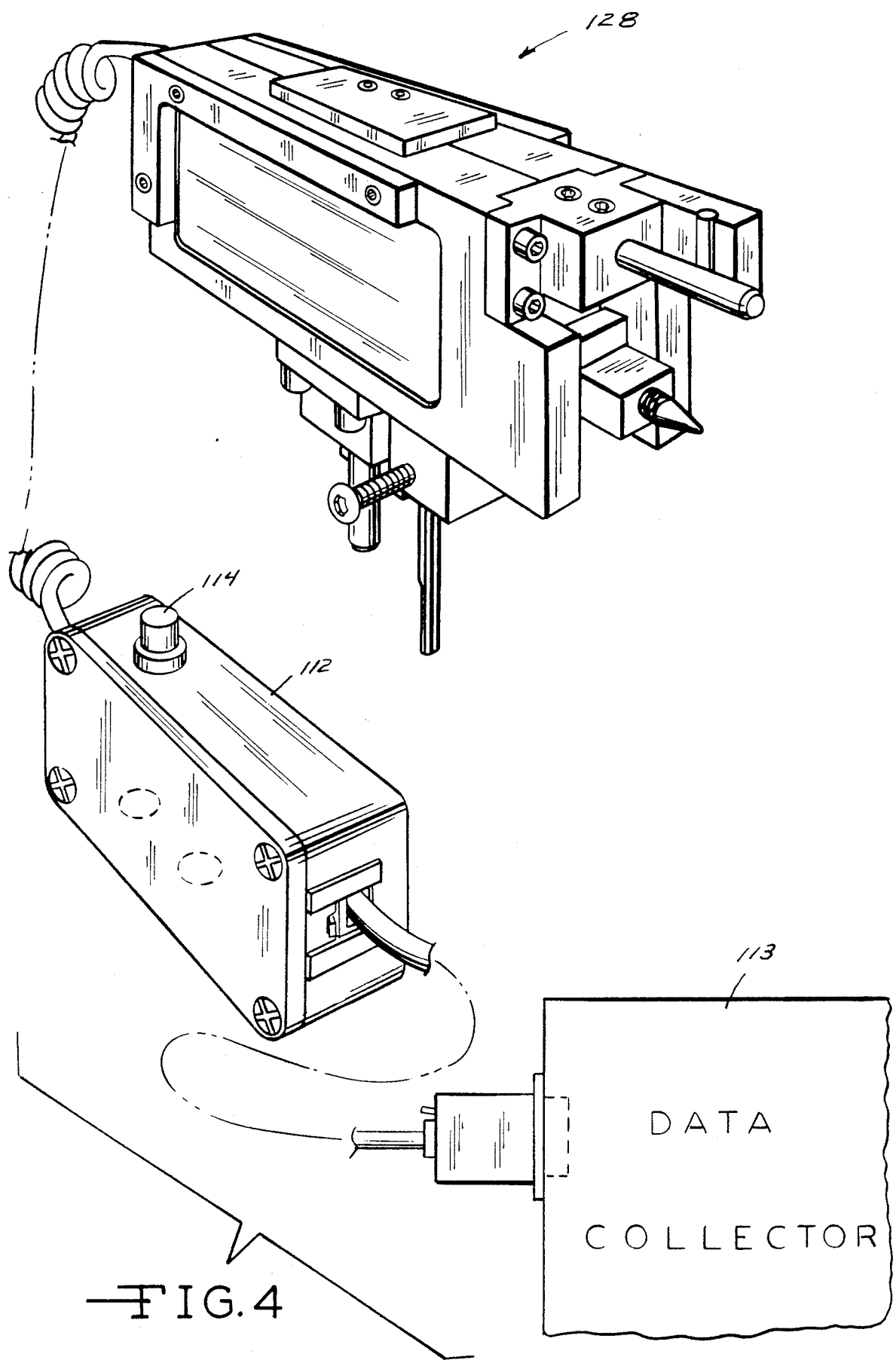
FIG. 4 is a schematic perspective view of the contour and outline transducer gage assembly having a round locator shaft or peg mounting system with an associated interface control unit and data collector.

As shown in FIG. 4, another embodiment of the contour and outline gage 128 is utilized in association with the interface control unit 112 and a data collector unit 113. As will be hereinafter explained, the contour and outline transducer gage assembly provides a computer data readout of the contour or gap check measurement selectively being taken by the contour and outline transducer gage 128.

As shown in FIG. 4A, the contour and outline transducer gage 128 is positioned so as to make an outline (gap) check of a part 105. In making the outline (gap) check, the spring biased outline (gap) check pin or finger 115 of the gage 128 is manually retracted while the outline locator shaft 116 makes positive snapengagement with the locator bushing 101 fixedly mounted on the fixture rail 102. A flexible plastic biasing outline locking clamp 117 provided on the gage 128 has a transverse steel pin 118 which bears against the side of the locator bushing 101 so as to positively retain the outline locator shaft 116 within the locator bushing 101.

The spring biased outline (gap) check finger 115 is then allowed to extend against the part 105 being checked for proper location. The outline (gap) check reading is then taken by depressing the actuator button 114 located on the interface control unit 112. After the outline (gap) reading has been taken, the contour and outline transducer gage 128 is easily snapremoved from the locator bushing 101.

An external movable cover plate 129 is fixedly attached to the internal carrier arm assembly 106 and is movable therewith.

As shown in FIG. 4B, the contour and outline transducer gage 128 is positioned so as to make a contour (flush) check of the part 105. In making the contour (flush) check, the spring biased contour check pin 119 is pushed inwardly into the gage 128 while the contour locator shaft 112 is inserted into locator bushing 101. The contour locator shaft 120 is held in its use position within the locator bushing 101 by the contour locking clamp 121 which is also provided with a steel contact pin 122 which bears against the side of the locator bushing 101.

As shown in FIG. 4C, the front view of the transducer gage 128 also shows the spaced-apart opposed biasing position of the downwardly extending flexible locking clamp 117 in relation to the outline locator shaft 116. This same biasing locking relation exists between the locking clamp 121 and the contour locator shaft 120.

Figure 5:
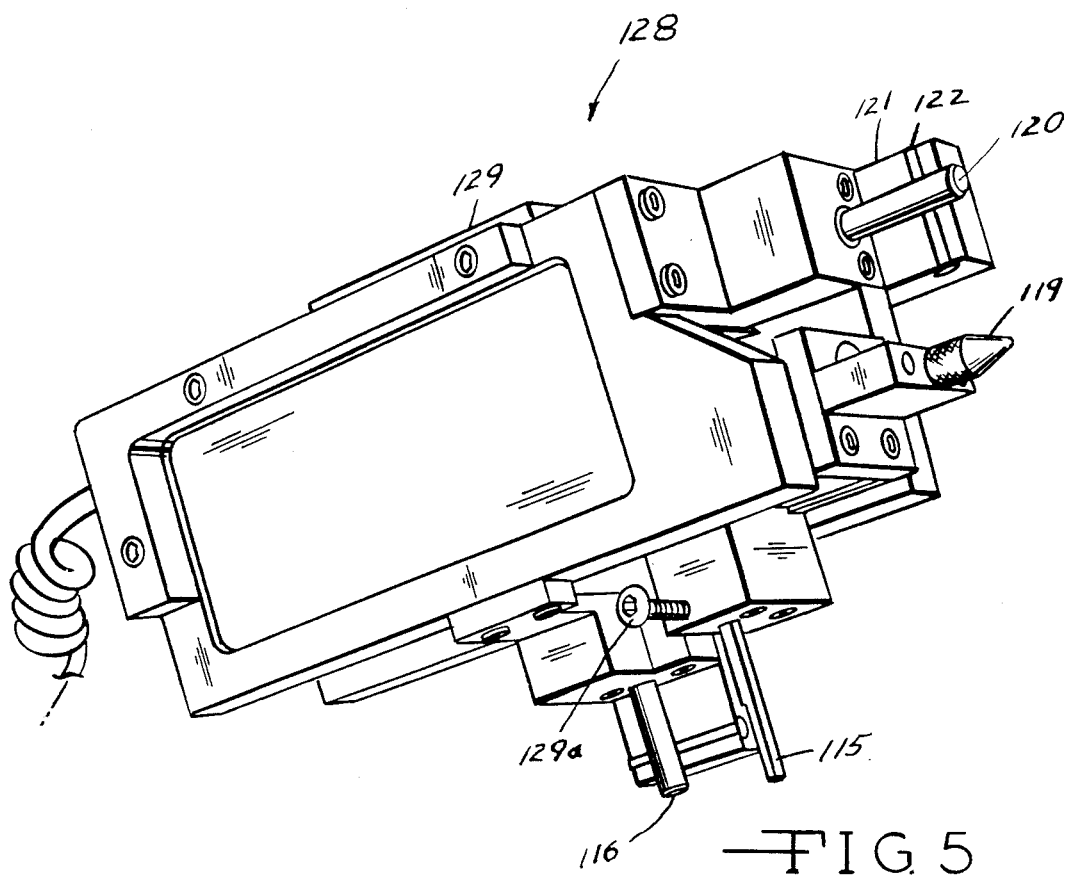
FIG. 5 is a schematic bottom perspective view showing the contour and outline transducer gage assembly.

The bottom perspective view of FIG. 5 shows more clearly the various components of the contour and outline transducer gage 128 as previously discussed. In addition, the gap check finger 115 is adjustably mounted in association with an adjusting screw 129a to permit selective longitudinal adjustment of the gap check finger 115.

Figure 6:
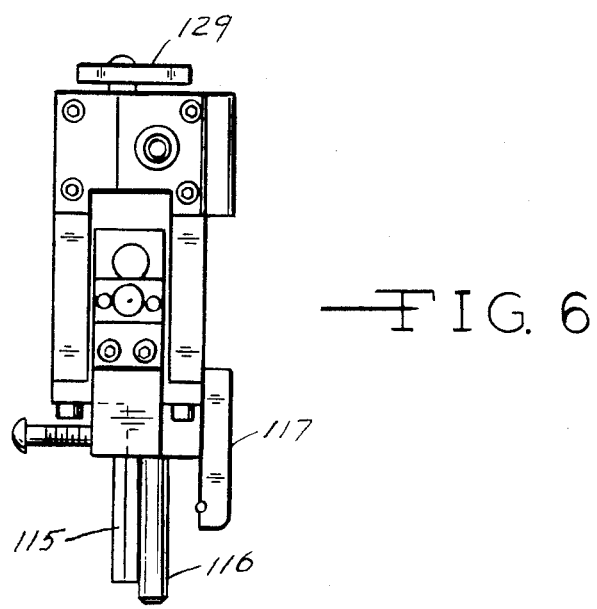
FIG. 6 is a schematic front elevational view and outline transducer gage assembly showing the offset round locator peg.

As shown in FIG. 6, the outline locator shaft 116 on the gage 128 is selectively offset so as to accommodate various types of locator bushing mounting systems such as the dual bushing mounting system shown in FIGS. 7 through 10.

As shown in FIG. 7, the contour and outline transducer gage 128 is selectively positioned on dual bushing 130 so as to make an outline (gap) check of the part. The relative installed position of the outline locator shaft 116 within the dual bushing 130 is shown in the partial cross sectional view of FIG. 8.

As shown in FIG. 9, the contour and outline transducer gage 121 is selectively positioned on dual bushing 131 so as to make a contour (flush) check of a part. The relative installed position of the contour locator shaft 120 within the dual bushing 131 is shown in the partial cross-sectional view of FIG. 10.

Figures 11, 12:
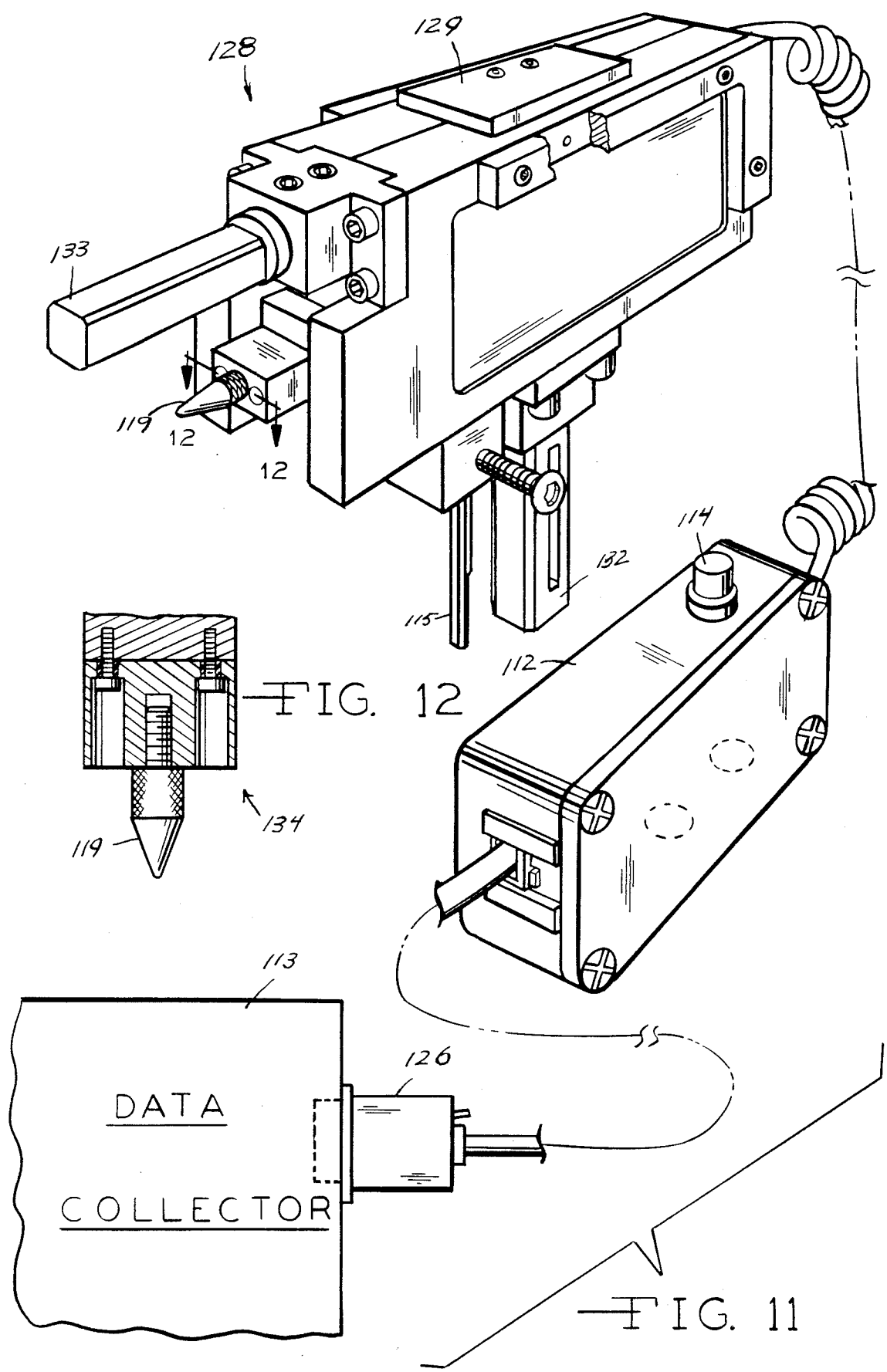
FIG. 11 is a schematic perspective view of another embodiment of the contour and outline transducer gage assembly having a square peg mounting system with an associated interface control unit and data collector.
FIG. 12 is a partial sectional view taken on line 12—12 of FIG. 11 showing the contour pin mounting assembly.

As shown in FIG. 11, another embodiment of the contour and outline transducer gage 128 is provided with a square outline locator shaft 132 and a square contour locator shaft 133 which are adapted to matingly engage corresponding locator bushings provided on fixture rails.

A modified contour check pin holder assembly 134 is shown in the partial sectional view of FIG. 12.

Figure 13:
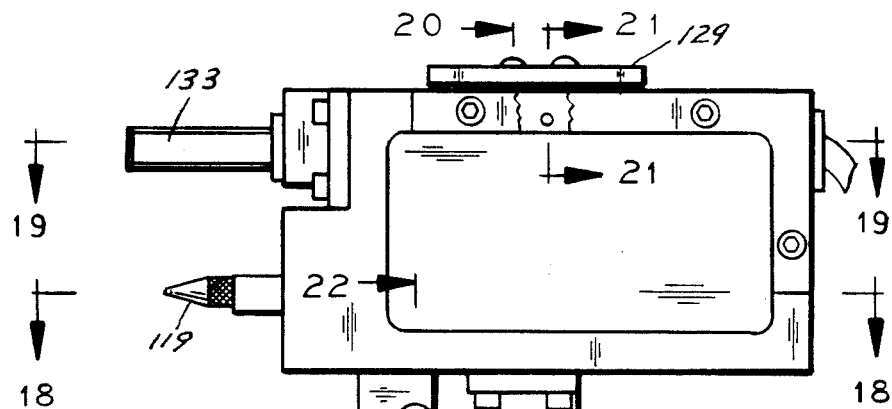
FIG. 13 is a schematic side elevational view showing the transducer of FIG. 11 positioned on a fixture rail bushing for making a gap check.

As shown in FIG. 13, the transducer gage of FIG. 11 is selectively positioned on the modified locator bushing assembly 135 and associated extension sleeve 135a so as to make an outline (gap) check. A locking pin 136 is provided through the bushing 135 and the extension sleeve 135a so as to lockably engage the square locator shaft 132 positioned therein.

Figure 14:
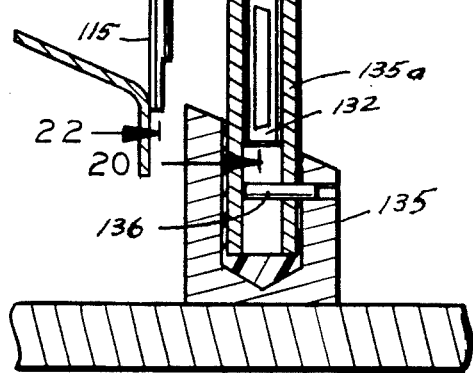
FIG. 14 is a schematic side elevational view showing the transducer of FIG. 11 positioned for making a contour check.

As shown in FIG. 14, the transducer gage 128 of FIG. 11 is selectively positioned on the modified locator bushing assembly 135 for making a contour (flush) check. The square contour locator shaft 133 is shown in mating engagement with the locator bushing assembly 135.

Figure 15:
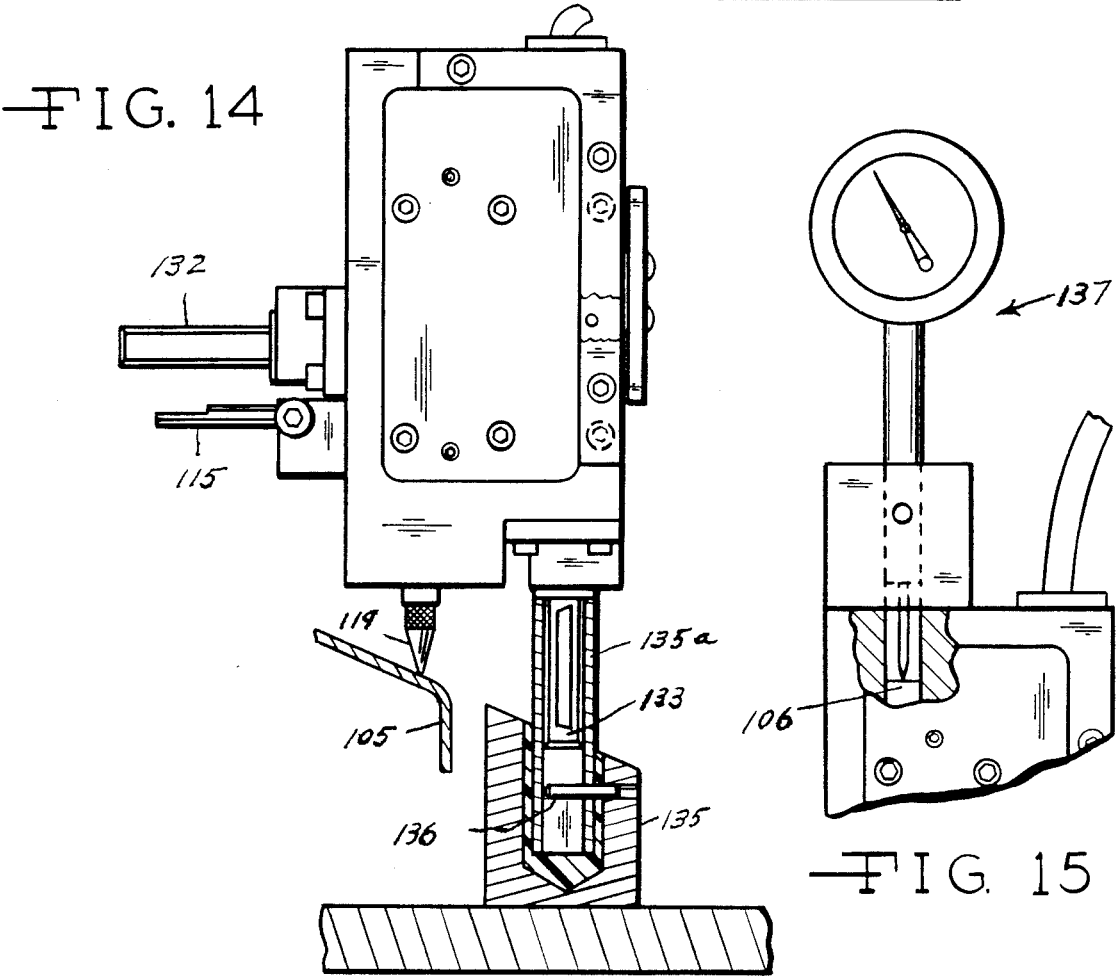
FIG. 15 is a partial schematic view of the transducer provided with a dial indicator gage.

As shown in FIG. 15, the transducer gage 128 can be modified to provide for a direct readout by use of a dial gage assembly 137 in operative engagement with the movable internal carrier arm assembly.

Figure 16:
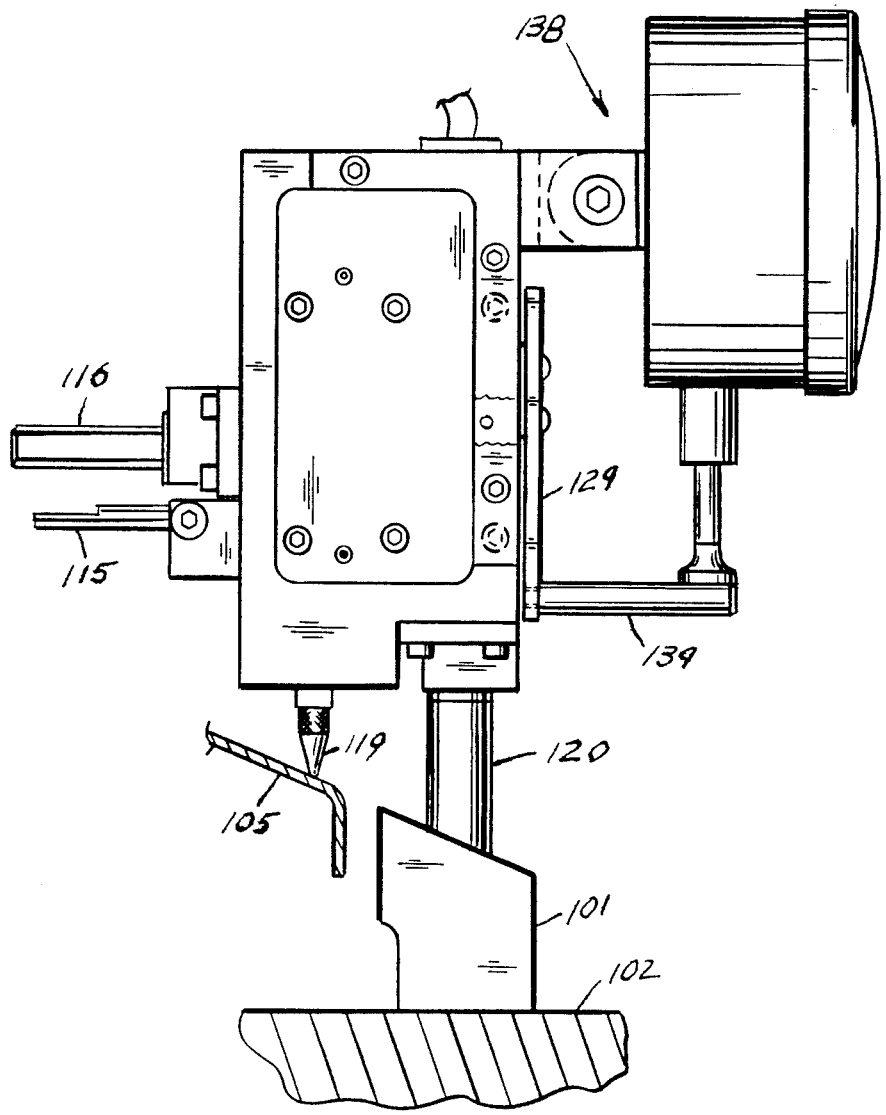
FIG. 16 is a side elevation view of a transducer provided with a dial indicator showing the assembly positioned for making a contour check.

Another embodiment of the transducer gage 128 is shown in FIG. 16 whereby a readout gage 138 is fixidly attached to the exterior of the gage 128. An actuator arm 139 is provided on the movable cover plate 129 so as to actuate the readout gage 138.

Figure 17:
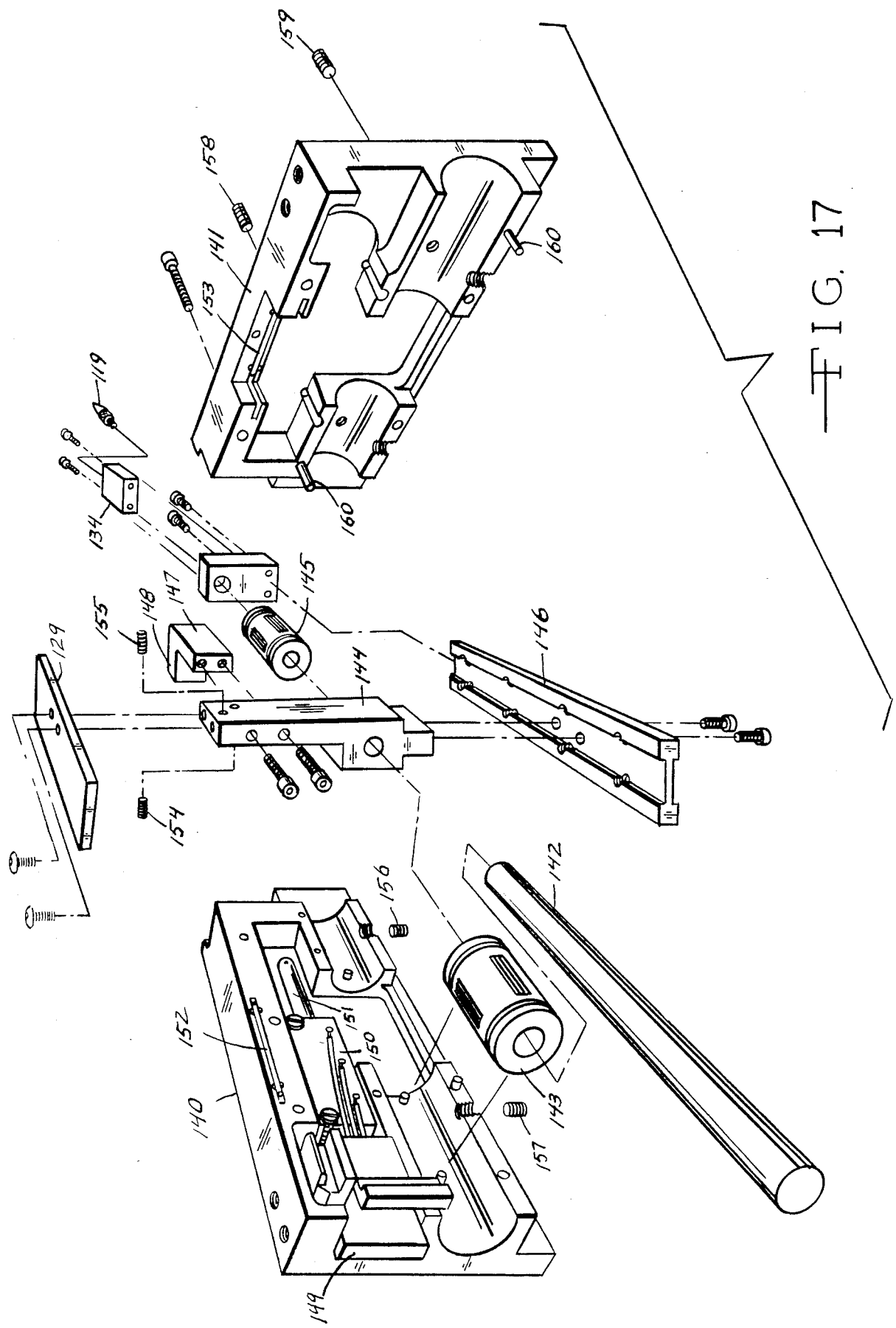
FIG. 17 is an exploded perspective view of the contour and outline transducer gage assembly showing the linear potentiometer, the carrier arm and the bushing mounting system.

An exploded internal perspective view of the internal operating components of the contour and outline transducer gage 140 is shown in FIG. 17.

The contour and outline transducer gage assembly 128 shown in FIG. 17 comprises a left external case 140 and a right external case 141. When assembled, the external cases 140 and 141, respectively, internally support the components of the transducer gage 128 as described hereinafter. The bushing shaft 142 operatively engages a rear bushing 143, the carrier arm 144 and the front bushing 145. The carrier arm 144 extends downwardly to fixedly engage the adjusting-outline check block holder 146. The carrier arm 144 extends upwardly to fixedly engage the carrier arm extension 147 which is provided with a linear potentiometer pin contact arm 148. The contour check tip holder assembly 134 is attached to and movable with the carrier arm 144. When the contour and outline transducer gage 128 is fully assembled, the contour check tip holder 134 extends outwardly therefrom so that the contour check pin 119 selectively comes into contact with the part being engaged.

The left external case 140 is adapted to supportably engage a modular electrical connector 149 and the linear potentiometer 150 which is operatively connected thereto. The linear potentiometer 150 is provided with an outwardly extending spring biased potentiometer contact pin 151 which is adapted for selective operative engagement with the linear contact pin carrier extension arm 148 of the carrier extension arm 147.

As further shown in the exploded view of FIG. 17, the left external case 140 is also provided with a left lash adjusting shaft 152 and the right external case 141 is provided with a corresponding right lash adjusting shaft 153 which are adapted to engage the corresponding left lash adjusting screw 154 and the right lash adjusting screw 155 provided in the carrier arm 144. The carrier arm 144 is thus provided with a lash adjustment capability while it is being assembled. Similarly, front and rear vertical adjustment screws 156 and 157, respectively, provide front and rear bushing vertical adjustment capability of the bushing shaft 142 when assembled in its operative use position within the gage 128. In addition, front and rear bushing horizontal adjustment screws 158 and 159, respectively, provide horizontal adjustment capability of the bushing shaft 142 within the assembled gage 128. Case alignment pins 160 and corresponding threaded holes are provided so as to facilitate mating closure of the cases 140 and 141, respectively.

Figure 18:
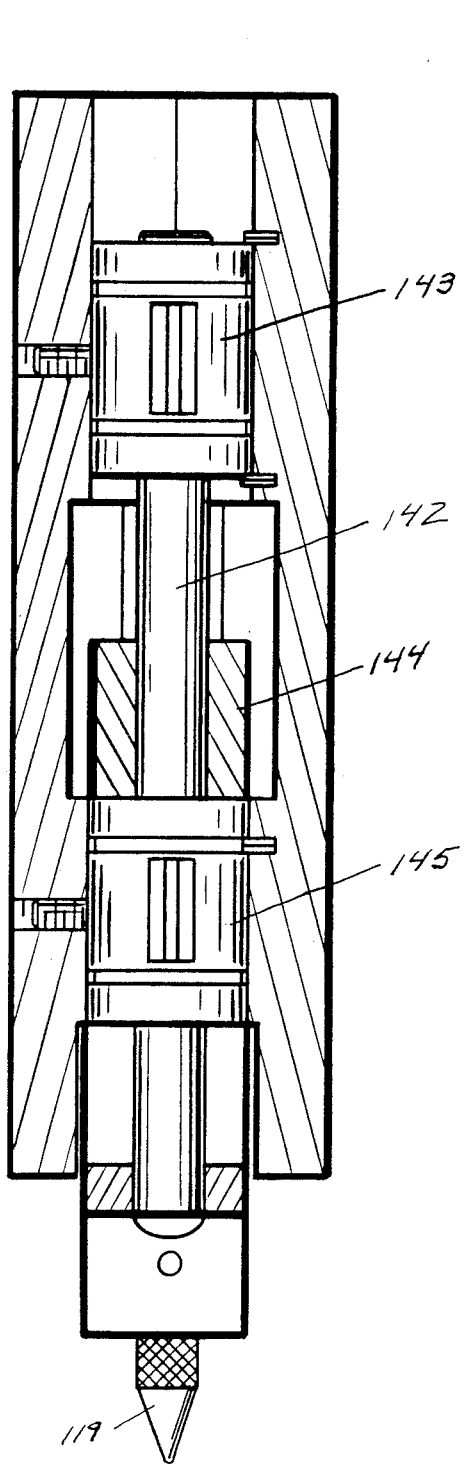
FIG. 18 is a sectional view taken on line 18—18 of FIG. 13 showing the bushing shaft and the front and rear bushings.

As shown in the sectional view of FIG. 18 taken along line 18—18 of FIG. 13, the various internal components of the assembled transducer gage 121 are shown in their corresponding operative use position. The bushing shaft 142 is shown in its assembled use position through the front bushing 145, the rear bushing 143, and the carrier arm 144.

Figure 19:
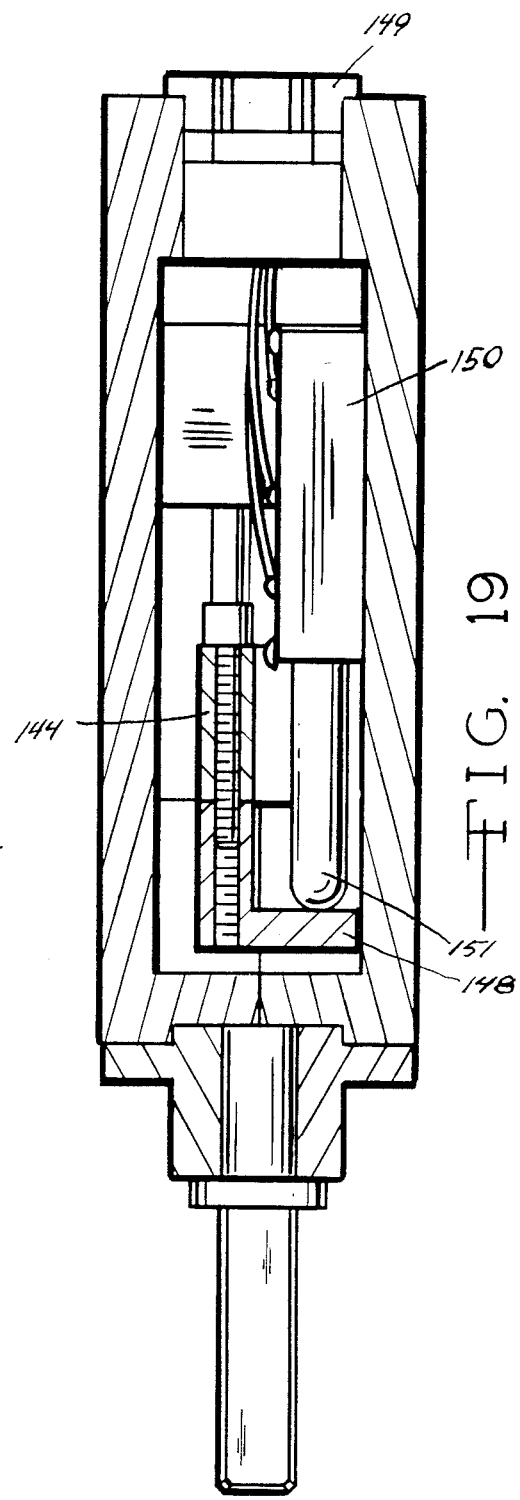
FIG. 19 is a sectional view taken on line 19—19 of FIG. 13 showing the linear potentiometer assembly in its operative use position within the transducer gage.

As shown in the sectional view of FIG. 19 taken along line 19—19 of FIG. 13, the linear potentiometer 150 is shown with the spring biased contact pin 151 in operative with the extension arm 148 of the carrier arm 144.

Thus, as the contour check pin 119 contacts the part 105 to be measured as shown in FIG. 4B, 14 and 16, the carrier arm 144 correspondingly moves in response to the movement of the pin 119. This causes the carrier extension arm 148 to correspondingly move the spring biased linear potentiometer contact pin 151 within the linear potentiometer 150 which, in turn, sends an electronic signal through the electrical connector 149 through the interface control unit 112 to the data collector 113 thereby recording the contour check measurement of the part location.

As shown in the sectional view of FIG. 20 taken on line 20—20 of FIG. 13, the movable cover plate 129 is fixedly attached to the carrier arm 144 and is movable therewith externally of the gage 128. The left lash adjusting shaft 152 is shown in adjusting contact with the left lash adjusting screw 154 positioned on the carrier arm 144. The linear potentiometer 150 is shown in its operating use position within the gage 128 with the spring biased contact pin 151 extending longitudinally therefrom. The bushing shaft 142 is shown positioned through the carrier arm 144. The carrier arm 144 is shown positioned on the adjusting outline check block holder 146. The square outline locator shaft 132 is shown extending downwardly from the outline locator shaft holder 132A provided on the bottom surface of the gage 128.

As shown in the partial sectional view of FIG. 21 taken on line 21—21 of FIG. 13, the right lash adjusting shaft 153 is shown in adjusting contact with the right lash adjusting screw 155 positioned on the carrier arm 144.

As shown in the partial sectional view of FIG. 22 taken on line 22—22 of FIG. 13, the front bushing 145 is shown in supportable engagement with the bushing shaft 142 and in adjustable engagement with the front bushing vertical adjustment screw 156 and the front bushing horizontal adjustment screw 158. In addition, the outline check block 146A positioned on the check block holder 146 and extending downwardly therefrom, is shown in adjustable engagement with the outline (gap) check finger 115.

The bottom view of FIG. 23 shows the plurality of square peg holder assembly mounting holes 161 provided along the left and right external case members 140 and 141, respectively. In addition, outline (gap) check block holder adjustment holes 162 are similarly provided along the gap check block holder 146.

Figure 24:
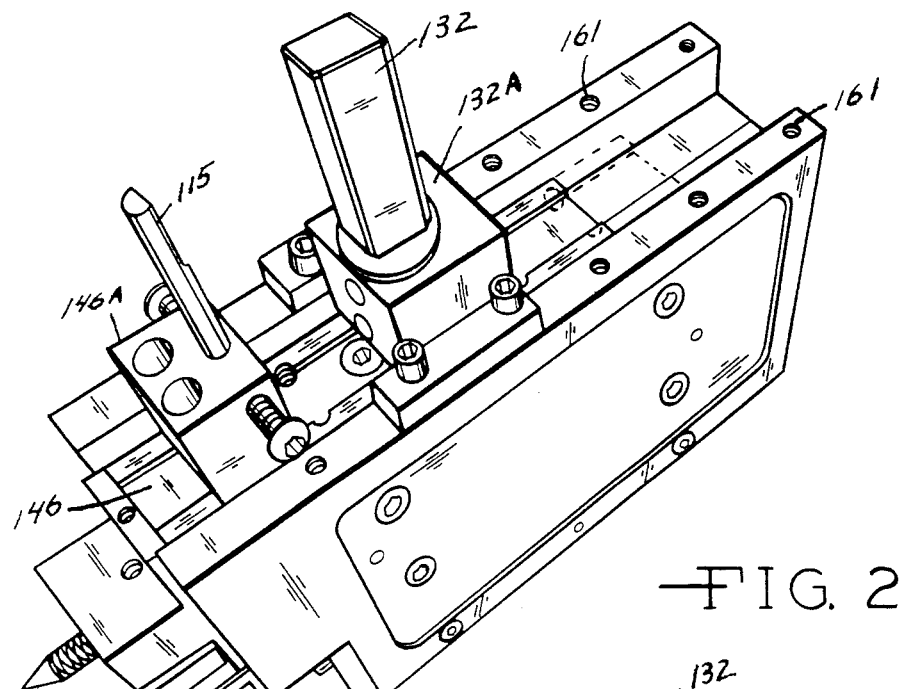
FIG. 24 is a bottom perspective view of the transducer gage showing the square locator peg mounting system in its forwardly positioned use position.
Figure 25:
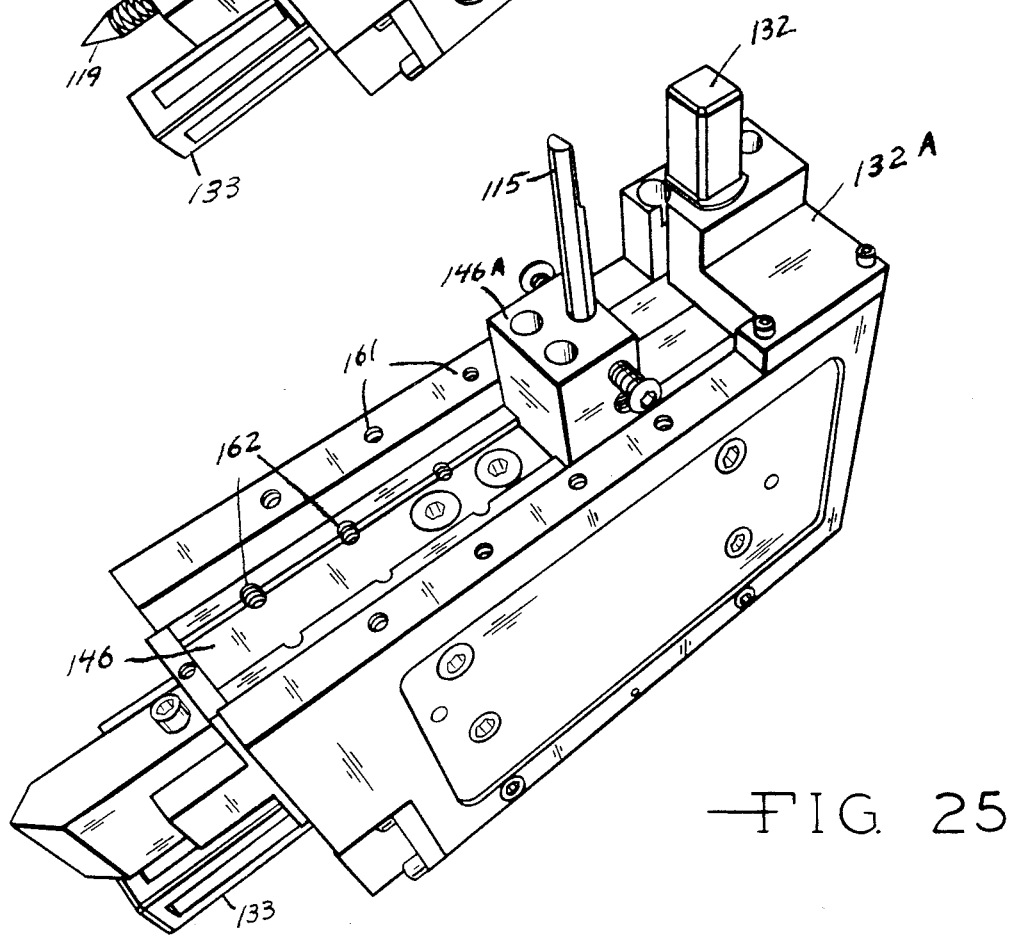
FIG. 25 is a bottom perspective view of the transducer showing an alternate rearward positioning of the square locator peg mounting system on the transducer gage.

As shown in the bottom perspective views of FIGS. 24 and 25, the provision of the square peg holder assembly mounting holes 161 and the outline check block holder adjustment holes 162 permit selective forward and rearward adjustment of the square locator peg holder assembly 132A and the outline (gap) check holder block assembly 146A along the bottom of the gage 128 as dictated by the location of the part being gaged.

Figure 26:
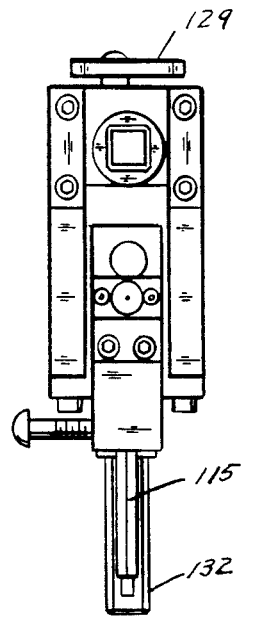
FIG. 26 is a front elevational view of the transducer gage showing the square locator peg mounted on center.

As shown in the front elevational view of FIG. 26, the outline square locator peg 132 can be centrally located so as to be in an in-line alignment with the outline gap check finger 115 as dictated by the type of fixture bushing system being utilized.

Figure 27:
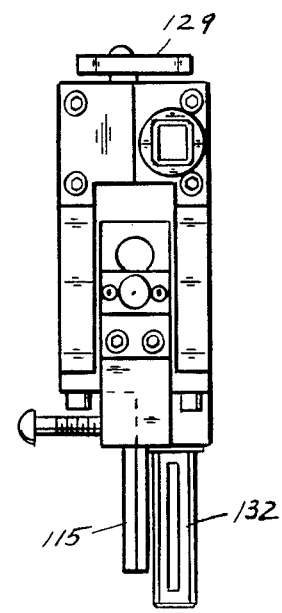
FIG. 27 is a front elevational view of the transducer showing the square locator peg mounted off center.

As shown in the front elevational view of FIG. 27, the outline square locator peg 132 can be selectively offset in relation to the gap check finger 115.

Figure 28:
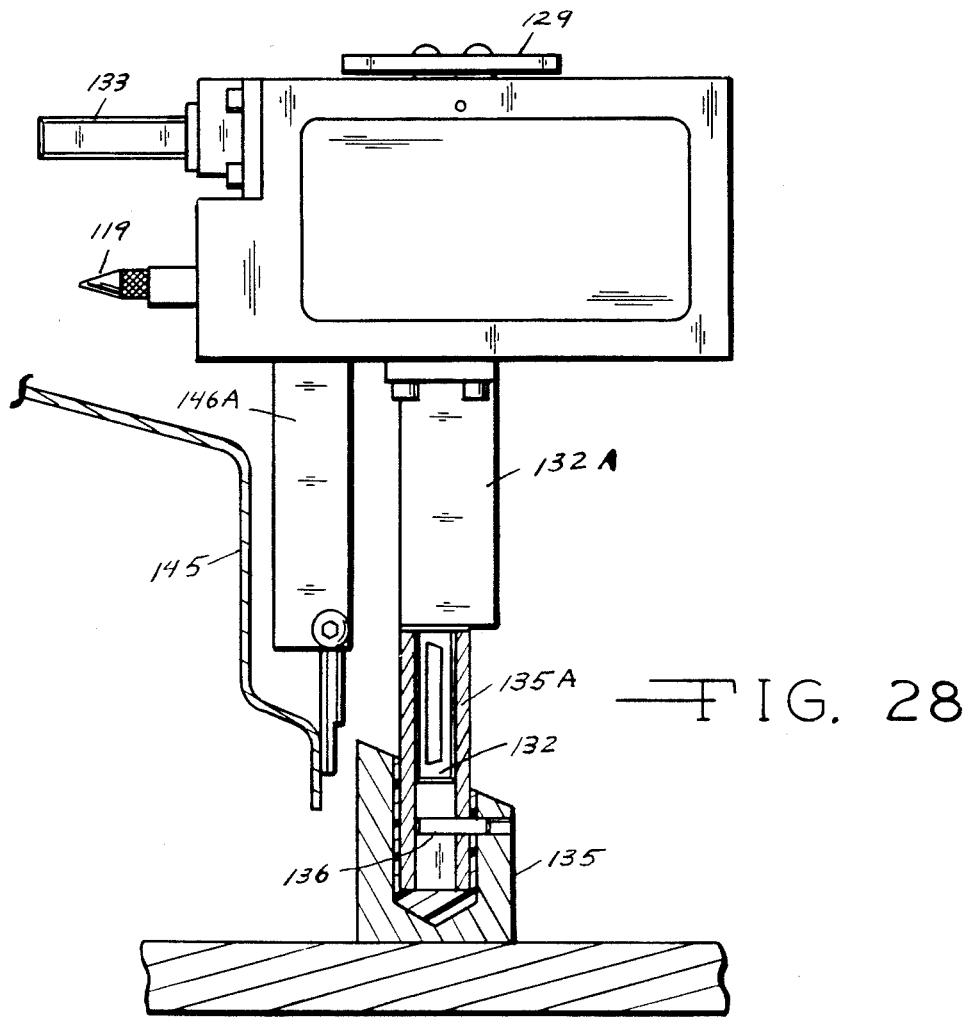
FIG. 28 is a side elevational view of another embodiment of the transducer with extended contact pin and locator peg mountings so as to facilitate making a gap check.

The side elevational view of FIG. 28 shows the transducer gage 128 as modified for use to conduct a gap check on unusually shaped part 105. The extended outline check block holder 146A and square peg locator holder 132A have been elongated so as to position the outline gap check finger 115 and square peg locator peg 132 in an extended position below the gage 128.

As shown in FIG. 29 the modified square peg 132 is provided with a base portion 132B which engages the peg holder assembly 132A and a square bushing engaging portion 132C. The square bushing engaging portion 132C has a longitudinally oriented transverse slot 132D provided therethrough so as to impart a longitudinal spring bias bulge 132E along one corner thereof. The transverse slot 132D which creates the bulge condition is shown in the sectional view of FIG. 31 taken on line 31—31 of FIG. 29. Additional alignment capability is attained by offsetting the square bushing engaging peg portion 132C as shown in FIG. 30.

The modified locator peg 132 is shown in its spring-loaded locked use position with square base portion 132C within the fixture rail bushing 135, as shown in FIG. 31A.

Figure 32:
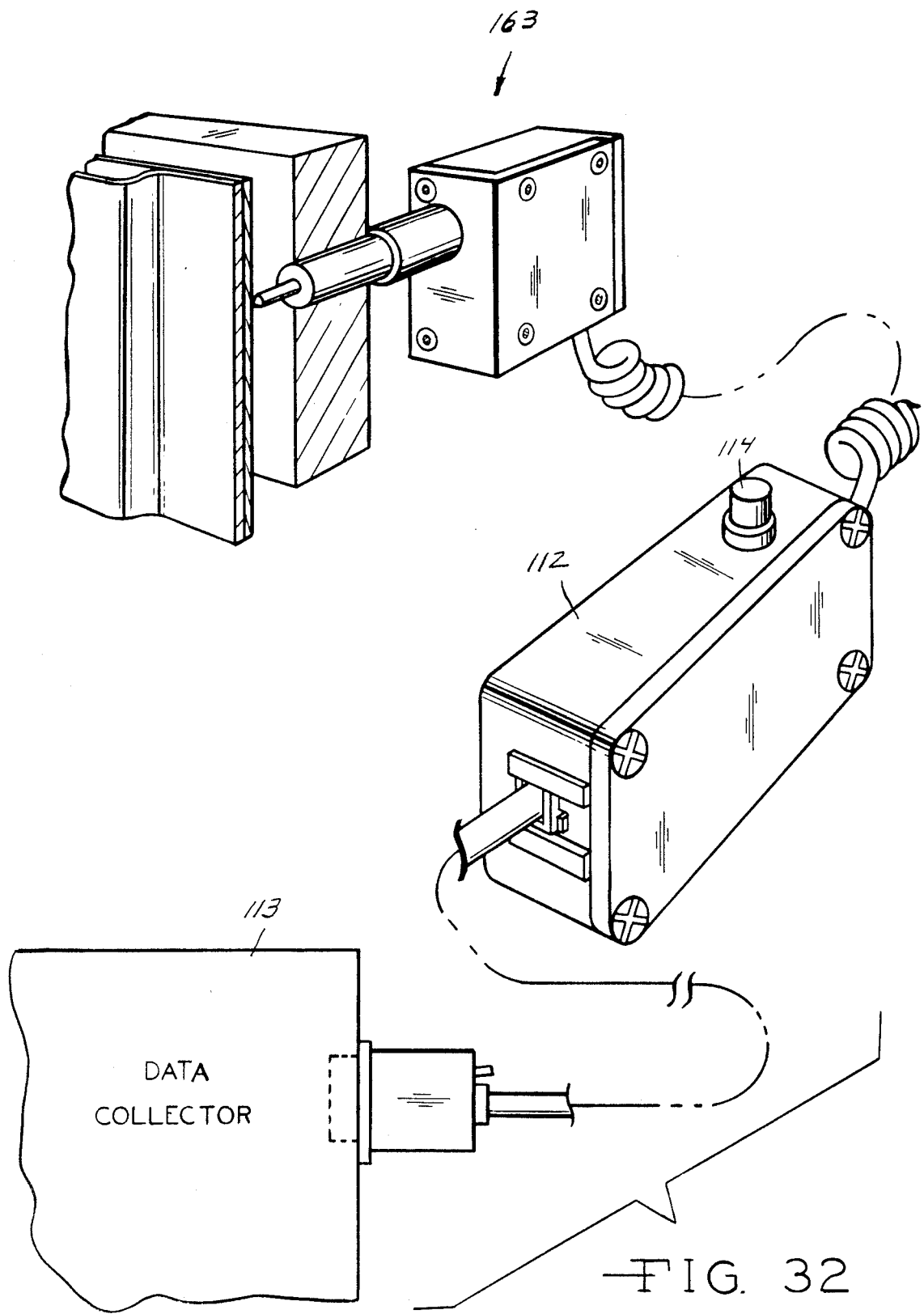
FIG. 32 is a schematic perspective view of the probe transducer gage with an associated interface control unit and data collector.

Another embodiment of this invention is the hand held probe transducer 163 in its operative use position in FIG. 32 in association with an interface control unit 112 and a data collector 113.

Figure 34:
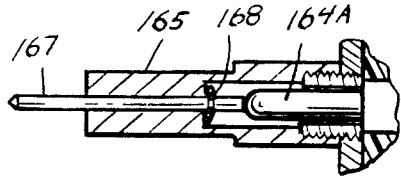
FIG. 34 is a sectional view of the probe transducer taken on line 34—34 of FIG. 33 showing the tip in contact with the linear potentiometer contact pin.
Figure 33:
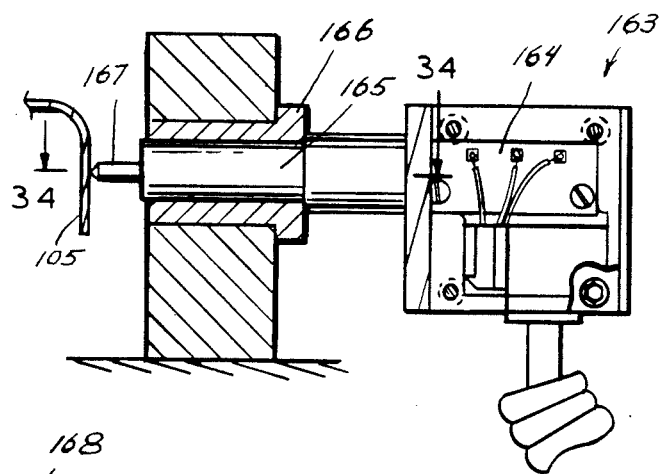
FIG. 33 is a partial broken away sectional view of the probe transducer in its operational use position with the case broken away to show the linear potentiometer.
Figure 35:
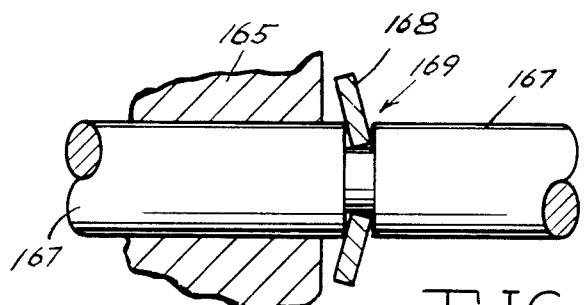
FIG. 35 is a partial schematic enlarged sectional view of the probe transducer showing the probe tip retained by a curved washer.

The schematic sectional view of FIG. 33 shows the linear potentiometer 164 within the body of the probe transducer 163. The probe barrel 165 is positioned through a fixture rail sleeve bushing 166 with the spring biased probe tip 167 in its gage position against a part 105. The partial cross-sectional view of FIG. 34 illustrates the probe tip 167 in its operational use position slidably mounted within the probe barrel 165 in operative engagement with the spring biased linear potentiometer contact pin 164A of the linear potentiometer 164. Movement of the probe tip 167 against the spring biased contact pin 164A actuates the linear potentiometer 164 as previously described. As further shown in FIG. 34 and in the enlarged schematic view of FIG. 35 the probe tip 167 is maintained in its operative use position within the probe barrel 165 by use of a curved spring washer 168 which engages an annular groove 169 provided in the surface of the probe tip 167.

Figure 36:
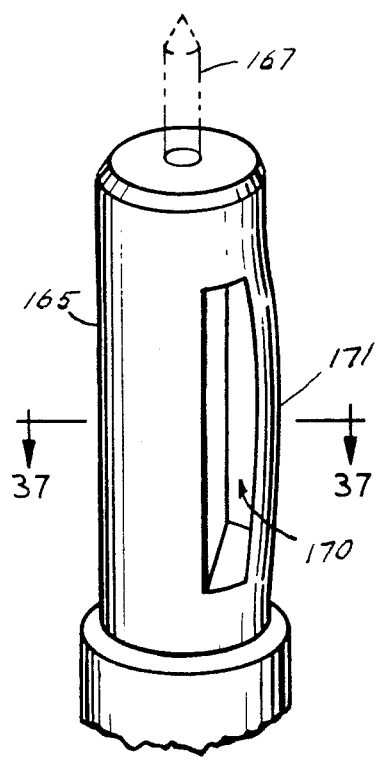
FIG. 36 is a perspective view showing the round probe barrel having an expander slot provided therethrough.
Figure 37:
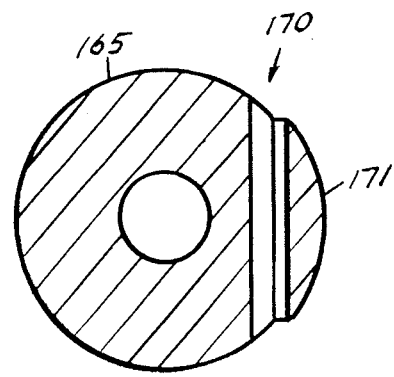
FIG. 37 is a cross-sectional view taken on line 37—37 of FIG. 36.
Figure 37A:
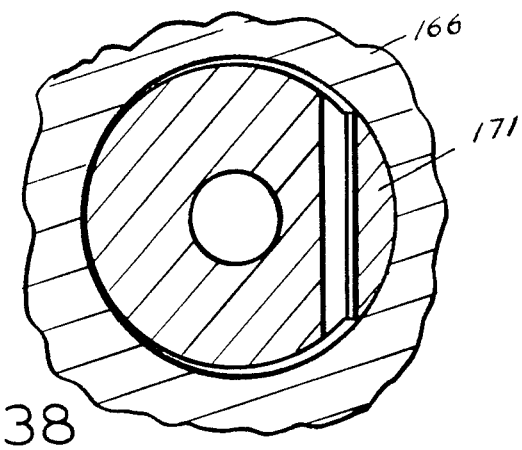
FIG. 37A is a schematic sectional view showing the round probe barrel of FIG. 36 positioned in its in situ biased locked position with a hole.

Other modified forms of the probe barrel 165 are shown in FIGS. 36 through 39A. As shown in FIG. 36, a longitudinally oriented transverse slot 170 is provided through the round probe barrel 165 so as to create a spring biased bulge portion 171 therealong. This is clearly shown in the sectional view of FIG. 37 taken on line 37—37 of FIG. 36. As shown in FIG. 37A, the probe barrel 165 is securely maintained in its operative use position within the bushing by reason of the bulge portion 171.

Figure 38:
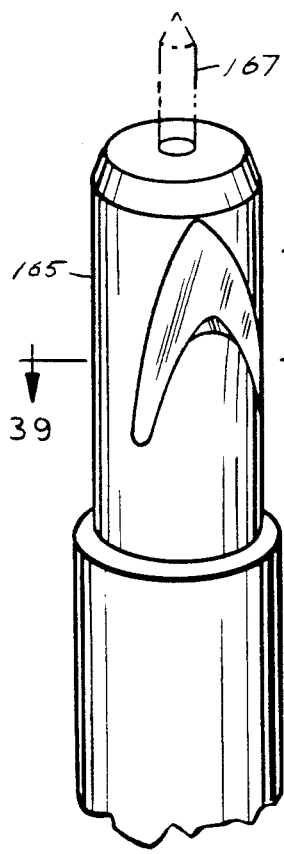
FIG. 38 is a perspective view of another embodiment of the probe barrel having another type of diagonal expander slot provided therein.
Figure 39:
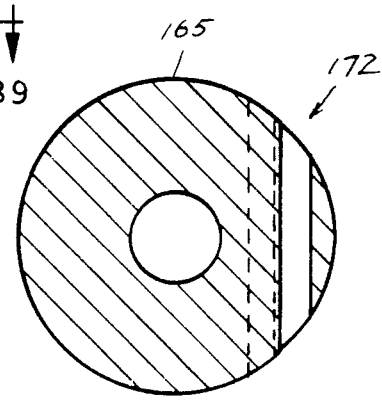
FIG. 39 is a sectional view taken on line 39—39 of FIG. 38.
Figure 39A:
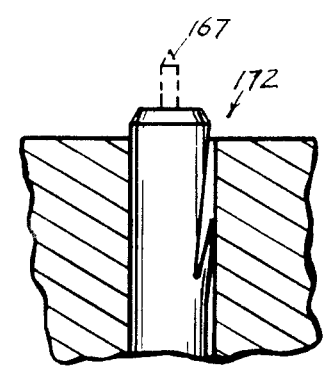
FIG. 39A is a schematic sectional view showing the probe barrel of FIG. 38 positioned in its in situ use position within a hole.

The same result can be obtained by use of a diagonal slot 172 as shown in FIGS. 38 through 39A.

Figure 40:
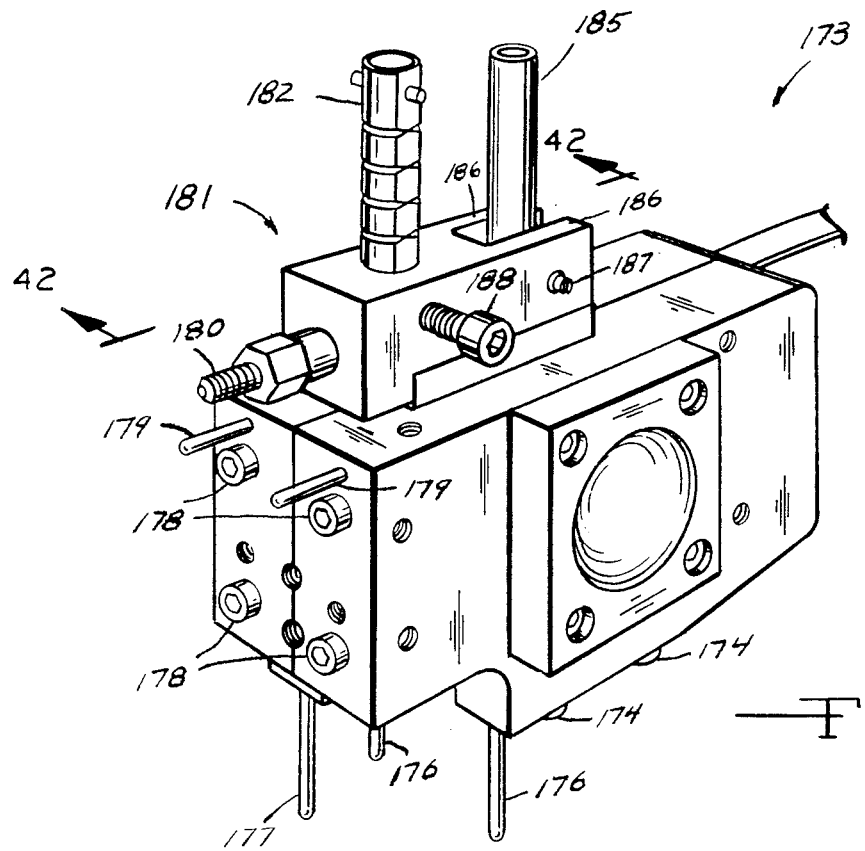
FIG. 40 is a perspective view of a hand held contour and outline transducer gage showing the adjustable contour pin support assembly provided thereon.
Figure 41:
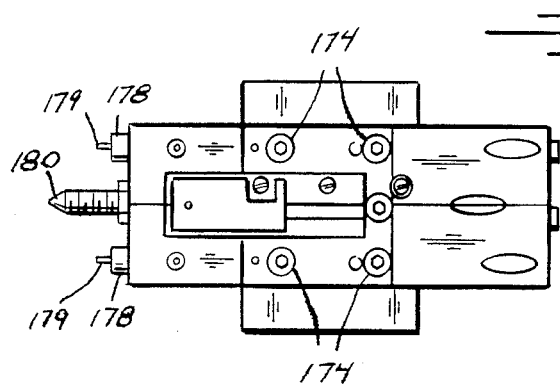
FIG. 41 is a bottom view of the transducer gage shown in FIG. 40.

Another modified form of the invention is the contour and outline transducer gage 173 as shown in FIG. 40. The transducer gage 173 is provided with four downwardly extending gap check support pegs 174 which are adapted to rest upon the upper surface of the fixture rail 175 as shown in FIG. 45. In addition, two downwardly extending gap check stop pins 176 are provided which are adapted to engage the front surface of the fixture rail 175 as shown in FIG. 45. The gage 173 is thus held in position by manual hand pressure while the gap check measurement is being taken by the gap check finger 177 against the part 105 as shown in FIG. 45. Similarly, contour check support pegs 178 are also provided on the forward surface of the gage 173. In addition, contour check stop pins 179 are also provided which are adapted to engage the front surface of the fixture rail when a contour check is being made by the contour check pin 180 as shown in FIG. 46. The contour check pin 180 is also mounted on an adjustable contour check pin support assembly 181. The bottom view of FIG. 41 further illustrates the relative positioning of the above described support pegs and stop pins upon the transducer gage 173.

Figure 42:
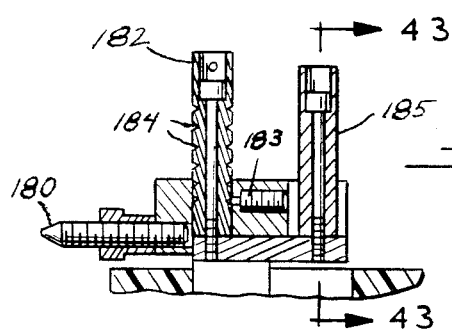
FIG. 42 is a sectional view taken on line 42—42 of FIG. 40 showing the adjustable contour pin support assembly.
Figure 43:
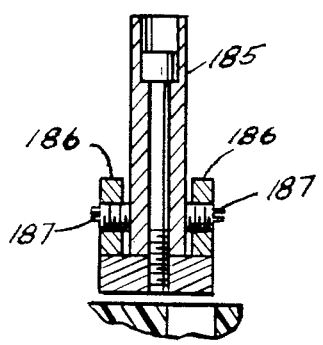
FIG. 43 is a sectional view taken on line 43—43 of FIG. 42.

As shown in FIGS. 40, 42, and 43, the contour check pin support assembly 181 is vertically adjustable along the vertical support pin 182. As shown in the cross-sectional view of FIG. 42, a spring biased ball detent 183 is adapted to engage position grooves 184 as the support assembly 181 is moved vertically to selectively raise or lower the level of the contour check pin 180.

A vertically oriented angularity adjustment pin 185 is provided on the gage 173 in a parallel spaced-apart position to the rear of the vertical support pin 182. The angularity pin 185 extends upwardly between the rear extensions 186 provided on the support assembly 181. Adjustment screws 187 are provided in the rear extensions 186 so as to bear against the angularity pin 185. A selective angular adjustment capability is thereby achieved whereby the support assembly 181 can be angularly adjusted about the vertical support pin 182 as desired by selectively adjusting the adjustment screws 187 as shown in FIG. 43.

A hexagonal head locking cap screw 188 selectively locks the contour pin support assembly 181 in any desired adjusted position along the vertical support pin 182. The contour check pin support assembly 181 is provided with a modified line contact contour check pin 189 as shown in FIG. 44.

The transducer gage 173 is positioned to make an outline gap check is shown in FIG. 45. The transducer gage 173 is positioned to make a contour check as shown in FIG. 46.

Figure 47:
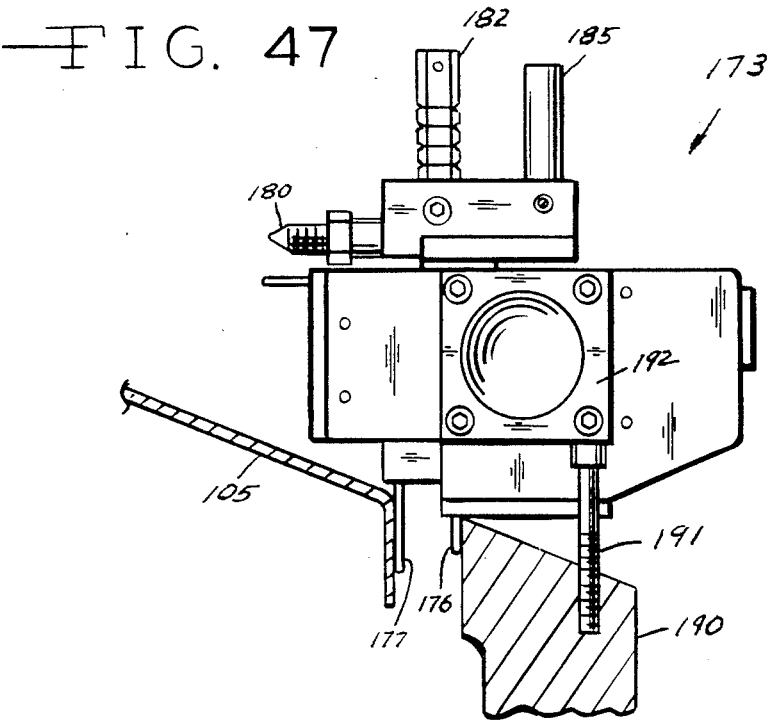
FIG. 47 is a side elevational view of the hand held transducer gage positioned on a horizontal level mount so as to make a gap check.
Figure 48:
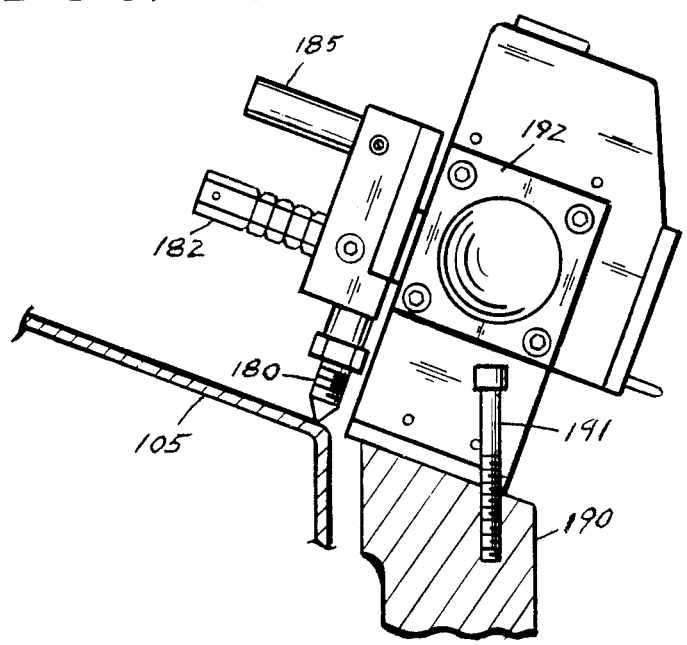
FIG. 48 is a side elevational view of the hand held transducer gage positioned to make a contour check.

As shown in FIGS. 47 and 48, a unique gage support system is provided for use in association with a fixture rail 190 which has a sloped upper surface. When it is desired to make an outline gap check as shown in FIG. 47, a vertically adjustable cap screw 191 is provided on the fixture rail 190 for selectively supporting engagement with the bottom edge of handle plate 192 so as to maintain the gage 173 in the horizontal operative use position necessary for making an outline gap. As shown in FIG. 48, the desired contour check can be easily made by disengaging the gage 173 from the cap screw 191 and resting the gage 173 directly on the fixture rail 190.

A further simplified transducer gage assembly 193 is shown in exploded form in FIG. 49. However, the basic concept embodied in the gage 193 is the same as that found in the other embodiments of the invention such as is shown in the exploded view of FIG. 17. As shown in FIG. 50, a linear slide ball assembly 194 is provided which consists of a holder 195 and a movable carrier arm support element 196 mounted therein. The movable carrier arm support element 196 is adapted for selective adjustable engagement with the carrier arm 197. The linear slide ball support assembly 194 is adapted for engagement with the left external case 198.

The carrier arm 197 is provided with an adjustable linear potentiometer contact pin engaging bolt 199 extending outwardly therefrom. The linear potentiometer 200 is provided with a spring biased contact pin 201 that comes into operative engagement with the carrier arm contact pin engaging bolt 199 when the linear potentiometer 200 is positioned in the right external case 202 when the gage 193 is fully assembled.

Figure 51:
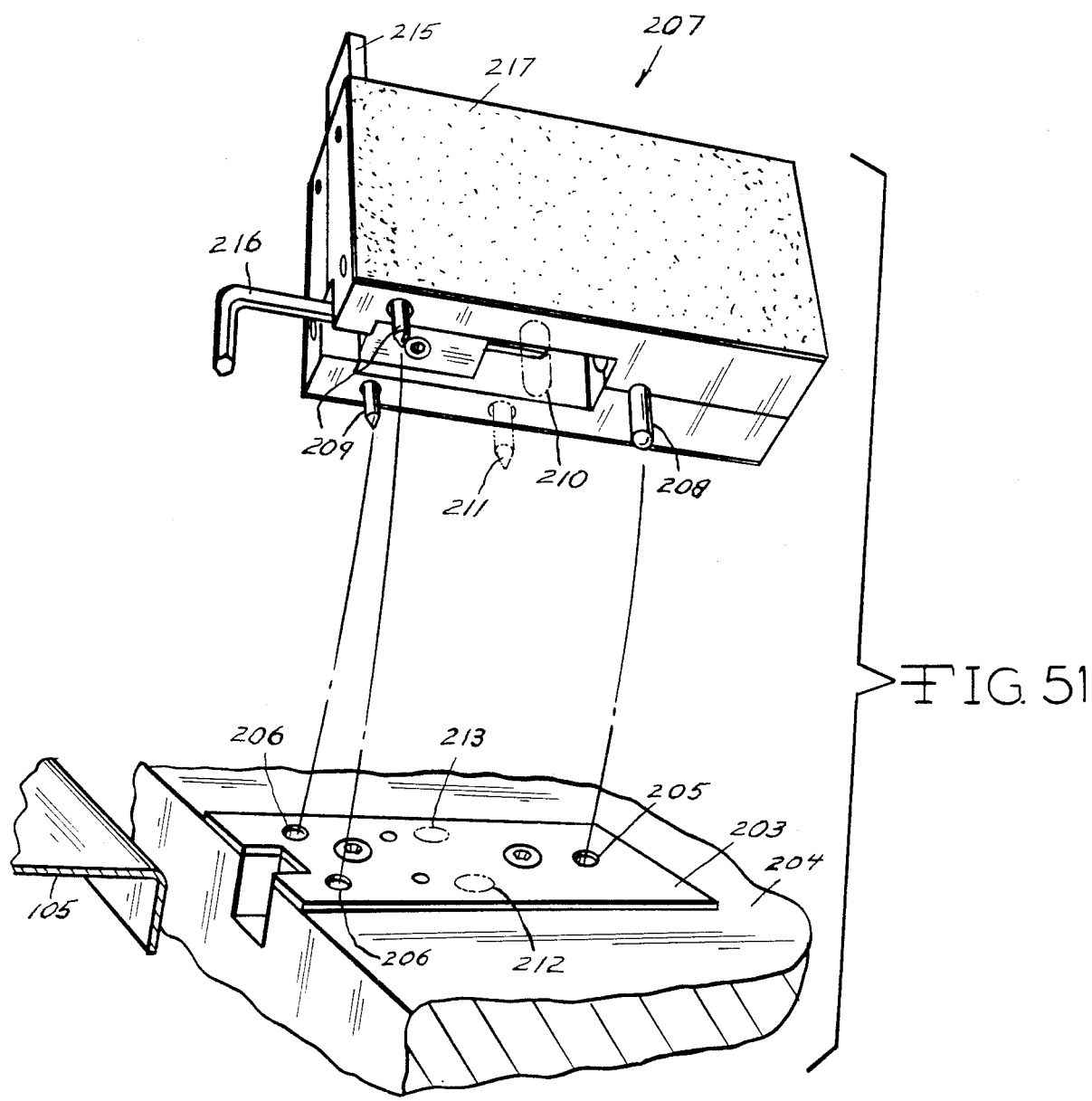
FIG. 51 is an exploded perspective view of a hand held transducer gage showing the spring peg snap-in mounting system.
Figure 52:
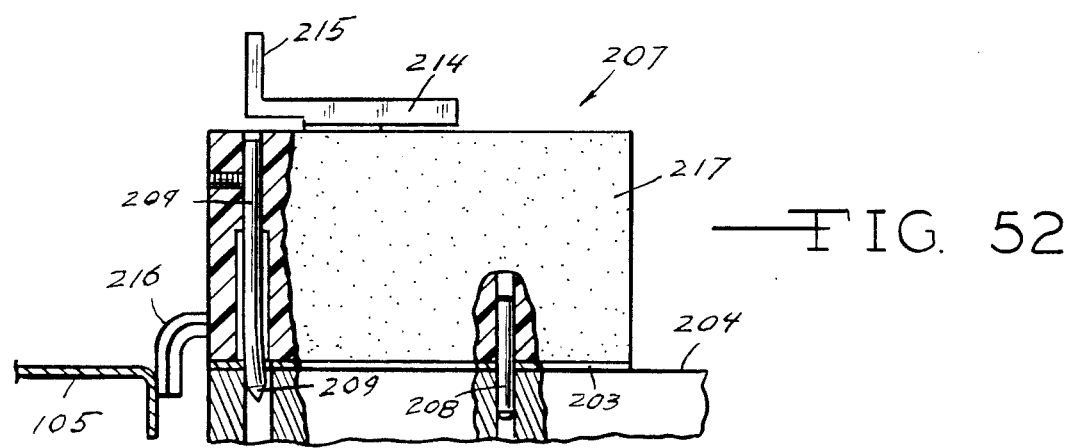
FIG. 52 is a schematic partial sectional view showing the transducer gage of FIG. 51 in its in situ use snap-in position on a fixture rail making a gap check.

As shown in FIGS. 51 and 52, another type of transducer gage-fixture rail mounting assembly is provided having a mounting plate 203 which is adapted for selective fixed engagement with the upper surface of a fixture rail 204. The mounting plate 203 delineates three locator peg positioning holes consisting of a rear locator peg positioning hole 205 and a pair of forward locator peg positioning holes 206 which have been drilled into the fixture rail 204. The modified transducer gage 207 is provided with three downwardly extending locator pegs consisting of a rear locator peg 208 and a pair of spring biased forward locator pegs 209. The rear locator peg 208 is adapted to matingly engage the corresponding rear locator peg positioning hole 205. As shown in FIG. 52, the forward spring biased locator pegs 209 are biased so as to make snap lockable engagement with the corresponding forward locator peg positioning holes 206 so as to maintain the transducer gage 207 in a fixed mating engagement with the fixture rail 204 while a gap check is being made. It is within the scope of the invention to utilize a similar front and rear in-line two locator peg system to accomplish a similar snap engagement with the fixture rail. The cross-sectional view of FIG. 52 would also be applicable for showing the two peg system.

Similarly, a four locator peg system could be utilized which comprised two forward spring biased locator pegs and two rear locator pegs in-line therewith. In either system, the forward or the rear locator pegs could be biased to achieve a stable locking engagement which had a quick and easy snap engagement and disengagement capability.

It is also within the scope of this spring peg locator mounting system invention that a transversely oriented two locator peg system be utilized as shown in phantom line in FIG. 51. As shown in the phantom line in FIG. 51, the two locator peg system consists of a relatively larger locator peg 210 and an offset opposed spring locator peg 211 which are adapted to make spring biased snap engagement with corresponding locator positioning holes 212 and 213, respectively, in the mounting plate 203 and fixture rail 204. The relative position orientation and size of the locator pegs on the transducer gages as discussed above and as shown in FIGS. 51 and 52 is not critical. However, the use of a fixed relatively non-flexible locator peg or shaft such as 208 and 210 in combination with one or more opposed spaced-apart spring biased pegs, such as 209 or 211, respectively, which coact to make snap locking engagement with the corresponding positioning holes located on the fixture rail 204 is believed to be inventive and patentable over the prior known art. Nowhere in the prior known art has there been shown a contour and outline transducer gage which is thus easily and quickly selectively installed into its operative use position in snap locking engagement with a fixture rail.

The embodiment of the hand held transducer gage 207 shown in FIGS. 51 and 52 is provided with an external movable cover plate 214 which is operatively connected to the internal carrier arm assembly 197 as previously described and is movable therewith. An upwardly extending activating arm 215 is provided on either end of the movable cover plate 214 which can be selectively actuated to retract the carrier arm mounted outline gap check finger 216 while the transducer gage 207 is being placed in its operative use snap engagement lock position on the fixture rail 204 as shown in FIG. 52. Upon release from its retracted position, the gap check finger 216 moves into the gage position in contact with the part 105 being gaged as shown in FIG. 52.

The embodiment of the transducer gage 207 shown in FIGS. 51 through 55 is provided with rough textured finger contact panels 217 on the sides thereof so as to facilitate positive hand gripping of the transducer gage 207 while it is being used.

Another embodiment of the hand held transducer gage 207 shown in FIG. 53 in its installed operative use position on the fixture rail 204 is provided with movable cover plate 218 having an upwardly extending contact post 219 which is adapted to selectively engage the contact pin 220 of the dial gage assembly 221 fixedly mounted on the transducer gage 207 so that direct gage reading can be taken as desired.

In FIG. 54, the transducer gage 207 is shown in its operative use position on a pivotal support fixture 222 so as to take a gage reading with respect to part 105.

Another embodiment of the hand held transducer gage 207 is shown in FIGS. 55 and 56 which can be used in connection with the fixture rail 204 without the need for gage locator peg bushings or holes provided on the fixture rail 204 itself. In this embodiment, the transducer gage 207 is provided with a pair of fixed spaced-apart downwardly extending fixture rail engaging fingers 223 and 224 which extend outwardly from the front face of the gage 204 so as to bracket the movable spring biased gap check finger 216 therebetween as shown in FIG. 56. As shown in the side elevation view of FIG. 55, the hand held transducer gage 207 can be selectively held in its operative use position on a fixture rail 204 with the downwardly extending fixture rail engaging fingers 223 and 224 in engagement with the front surface of the fixture rail 204 and with the movable biased gap check finger 216 in selective gap check reading contact with the part 105.

Figure 57:
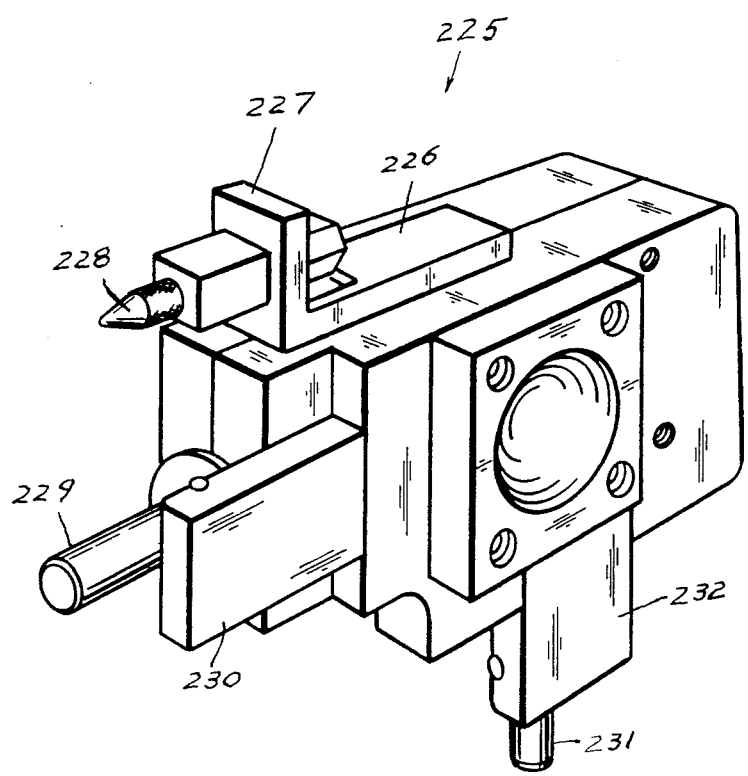
FIG. 57 is a perspective view of a modified transducer gage provided with a round locator peg mounting system with biasing lock means positioned thereon.

Another modified form of the invention is the transducer gage 225 as shown in FIG. 57. The movable cover plate 226 is provided with a vertical extension arm 227 which supports a contour check pin 228. The gage 225 is also provided with a round contour locator shaft 229 and a corresponding contour flexible bushing locking clamp 230 spaced apart therefrom. The gage 225 is also provided with a round outline locator shaft 231 and a corresponding outline flexible bushing locking clamp 232. The basic operation of the foregoing components of the gage 225 has been previously described with respect to the other embodiments of the tranducer gage and will not be repeated at this point but is incorporated herein by reference.

Figure 58:
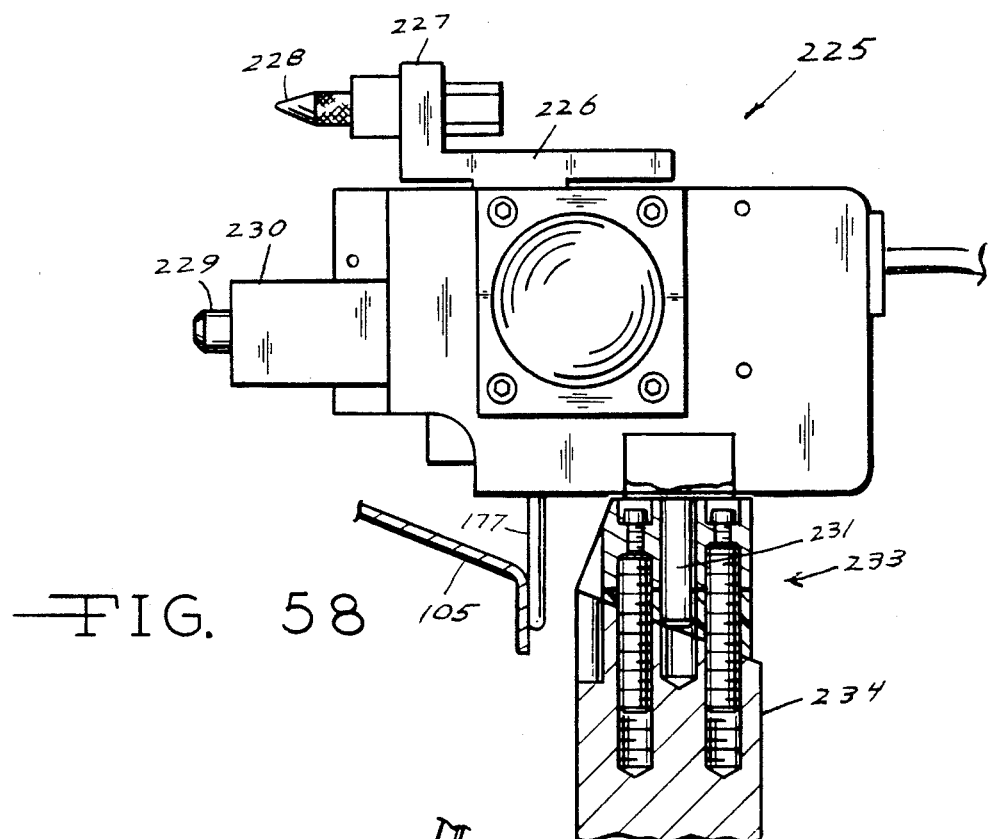
FIG. 58 is a side elevational view of the transducer shown in FIG. 57 positioned on a fixture rail mount block for making a gap check.

As shown in FIG. 58, the transducer gage 225 is mounted on an adjustable fixture rail bushing assembly 233 provided on the fixture rail 234 so as to make an outline (gap) check with respect to the part 105. Thus mounted, the round outline locator shaft 231 is lockably inserted into the fixture rail bushing assembly 233.

Figure 59:
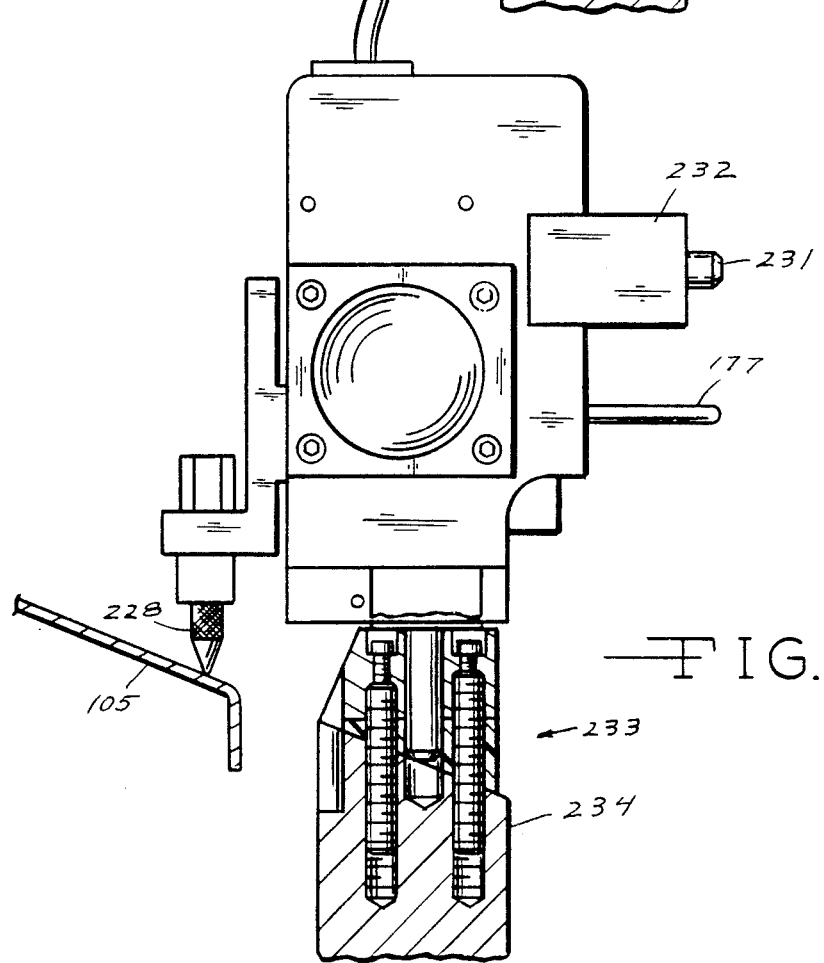
FIG. 59 is a side elevational view of the transducer shown in FIG. 57 positioned on a rail mount block for making a contour check.

As shown in FIG. 59, the transducer gage 225 is mounted on the fixture rail bushing assembly 233 so as to make a contour check with respect to the part 105. Thus mounted, the round contour locator shaft 229 is lockably inserted into the fixture rail bushing assembly 233.

Figure 60:
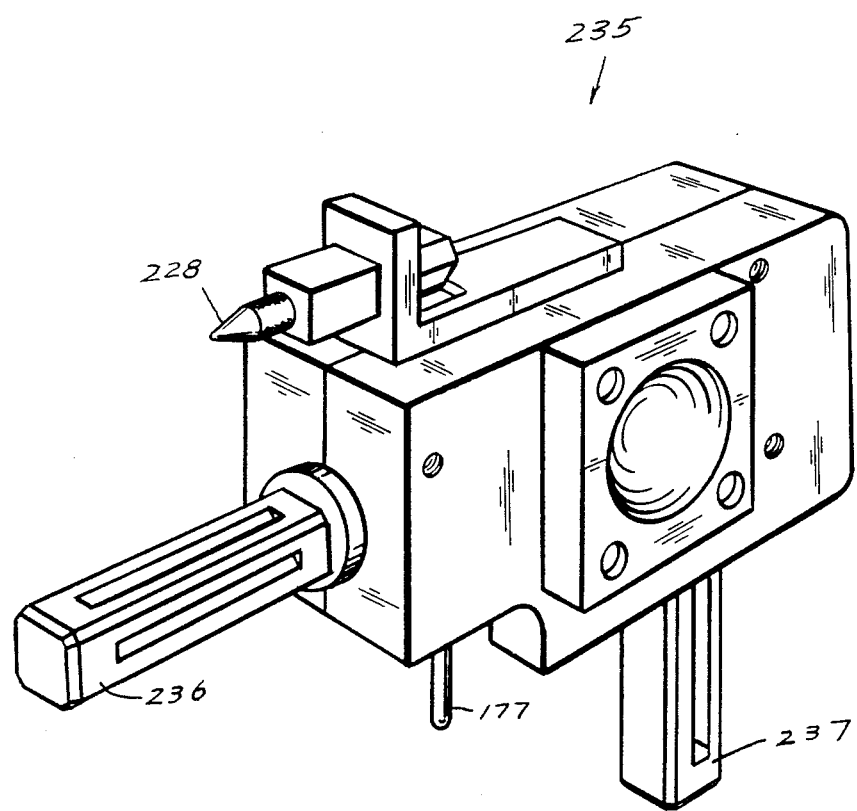
FIG. 60 is a perspective view of the transducer of FIG. 57 provided with a square locator peg mounting system.
Figure 61:
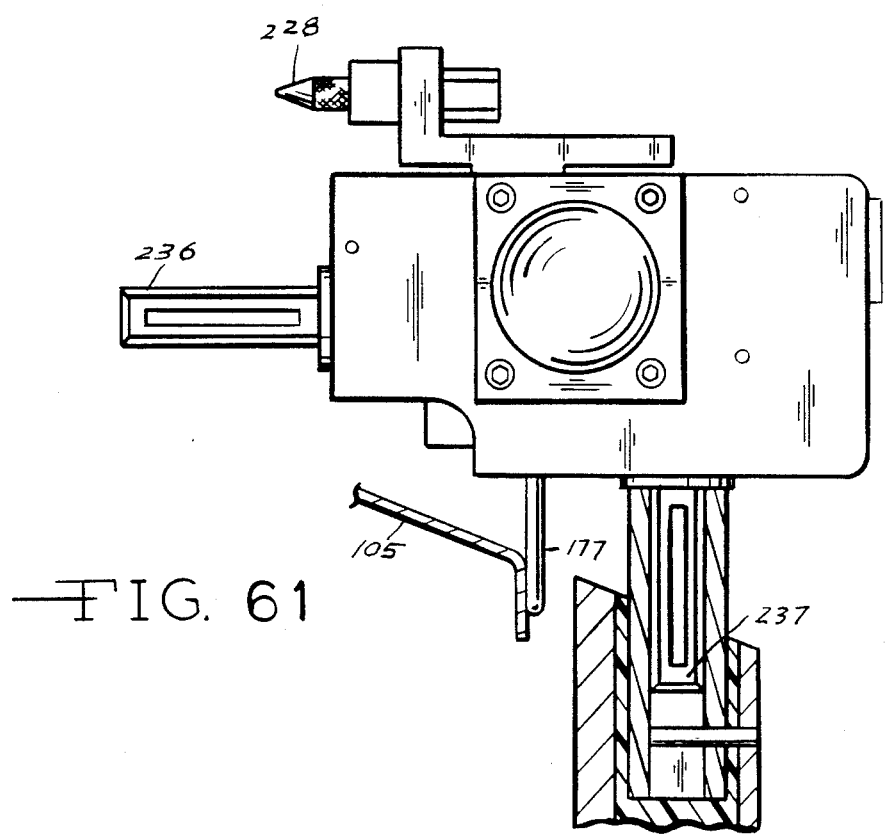
FIG. 61 is a side elevational view of the transducer shown in FIG. 60 mounted on a rail fixture square bushing positioned for a gap check.
Figure 62:
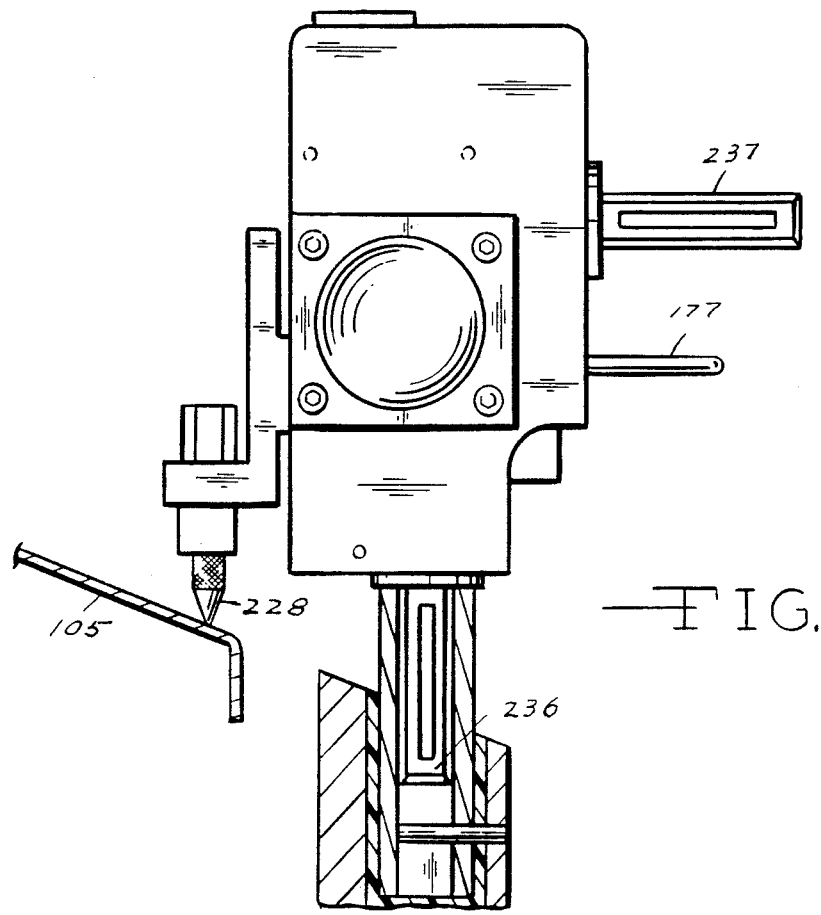
FIG. 62 is a side elevational view of the transducer shown in FIG. 60 mounted on a rail fixture square bushing positioned for making a contour check.

Another modififed transducer gage 235 is shown in FIG. 60 which is provided with square contour locator shaft 236 and a square outline locator shaft 237. In all other respects, the transducer gage 235 is similarly used to make an outline (gap) and contour checks as shown in FIGS. 61 and 62, respectively.

As shown in FIGS. 64 and 65, a connector converter plug 126 is provided which is utilized to interface a standard telephone plug 238 into a computer data collector readout unit 113. The connector converter plug 126 is shown in its operative use position in FIGS. 2 and 4. The converter plug 126 is utilized to connect the data collector input wires 239 to the conventional 6-wire telephone plug 238 provided on the telephone cable leading to the data collector 113 from the interface control unit 112.

The exploded view of FIG. 63 shows the various components utilized in fabricating the converter plug 126. The data collector interface plate assembly 240 is provided to operatively receive the converter plug interface assembly 241. The converter plug interface assembly 241 is covered by a folded aluminum sleeve 242 provided with fold-over clamp flanges 243 which are adapted to anchor the converter plug 126 to the data collector interface plate 240. The assembled converter plug 126 is covered by an appropriate heat shrink plastic sleeve 244.

A unique fixture rail mount block system is shown in FIGS. 66 through 73 which is adapted to be universally adjustable upon a fixture rail 245. As shown in the bottom view of FIG. 66, a plurality of spaced-apart fixture rail contact extensions 247 and front and rear jack post bolt receiving holes 248a and 249a, respectively, are provided on the bottom surface of the rail mount block 246.

A front jack post bolt 248 and a rear jack post bolt 249 are threaded into prepared threaded holes 248b and 249b provided in the fixture rail 245 as shown in FIG. 67. The jack post bolts 248 and 249 are internally threaded to receive cap screws 250 and 251, respectively, which are adapted to secure the rail mount block 246 into its finally adjusted operative use position on the fixture rail 245 as shown in FIG. 70.

Figures 72, 73:
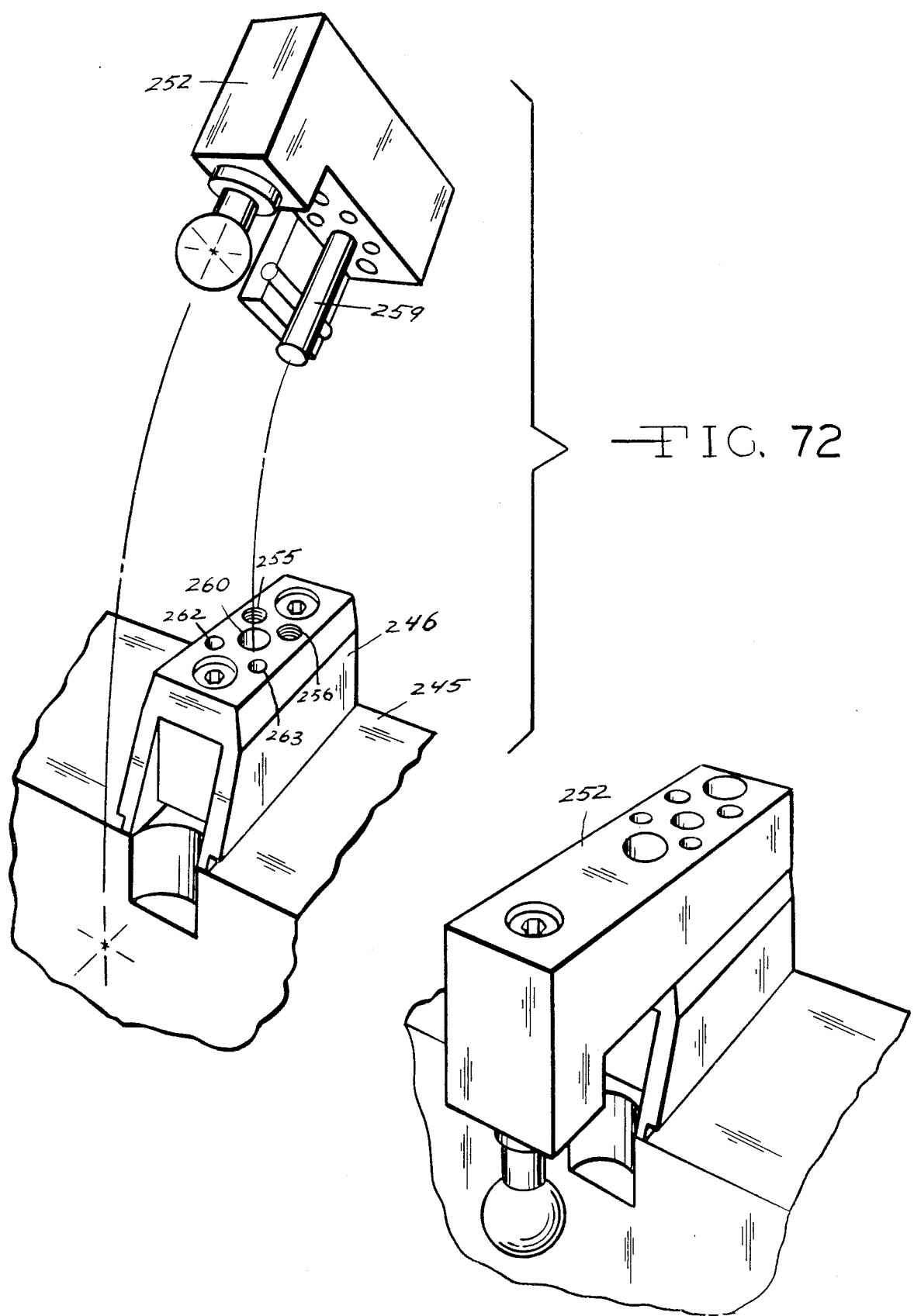
FIG. 72 is a schematic perspective view of an alignment ball block gage positioned for selective engagement with the fixture rail mount block.
FIG. 73 is a schematic perspective view of the alignment ball block gage in its in situ use position in selective engagement upon the fixture rail mount block with the gage ball adjustable to the desired part position.

The rail mount block 246 can be longitudinally adjusted (pitch) by selectively raising or lowering the jack posts 248 and 249 in relation to the fixture 245 so as to achieve the desired part position by use of the ball gage assembly 252 as shown in FIGS. 72 and 73.

The pitch adjustment capability of the rail mount block 246 is further shown in the sectional view of FIG. 70 taken on line 70—70 of FIG. 68.

The rail mount block 246 is selectively roll adjustable about its longitudinal axis by use of roll adjusting set screws 253 and 254 acting through corresponding spaced-apart threaded holes 255 and 256, respectively, provided vertically through the rail mount block 246 as shown in FIGS. 67 and the sectional view of FIG. 71 taken on line 71—71 of FIG. 69.

The rail mount block 246 also has a left-right yaw adjustment capability about its central vertical axis by virtue of the fact that the cap screw receiving holes 257 and 258 and the jack post receiving holes 248a and 249a provided therethrough are of a larger diameter than the corresponding cap screws 250 and 251 and jack post bolts 248 and 249 positioned therethrough as shown in FIG. 70.

In addition, the provision of the larger diameter cap screw receiving holes 257 and 258 and jack post bolts receiving holes 248a and 249a permits the rail mount block 246 to be selectively moved in any desired direction on the fixture rail surface while it is being adjusted into its final fixed operative use position.

The ball gage assembly 252 is provided with a simulated transducer gage locator shaft 259 which engages the locator shaft receiving hole 260 provided in the rail mount block 246 so as to verify the proper adjustment of the rail mount block 246 into the desired final operative use position on the fixture rail 245.

After the rail mounting block 246 has been universally adjusted into its desired operative use position on the fixture rail 245, a plastic setting glue 261 is poured into one of the roll lock pin receiving holes 262 and 263 so as to fill the open areas in the block 246 and between the bottom of the block 246 and the surface of the fixture rail 245 so as to fixedly encase the jack posts 248 and 249 and thus fixedly lock the mounting block 246 into its operative use position as finally adjusted on the fixture rail 245. After the plastic glue 261 has set and solidified, the roll lock pin receiving holes 262 and 263 are re-drilled and roll lock pins 264 and 265, respectively, are inserted thereinto to lockably maintain the adjustable rail mount block 246 in its finally adjusted operative use position on the fixture rail 245.

The universally adjustable rail mount block 246 as described herein is not found in prior art and permits the operative use of the transducer gage assembly described herein with a greater degree of gaging accuracy and ease of installation and operative use than has hitherto been possible.

In summary, a unique contour and outline transducer gage assembly is provided for selective mounting upon a fixture rail for selectively making outline (gap) and contour checks with respect to a part positioned proximate thereto.

A transducer gage housing is provided with fixture rail-engaging means extending outwardly therefrom. A linear potentiometer is fixedly positioned within the housing. The linear potentiometer has a spring biased linear potentiometer contact pin extending outwardly therefrom. A slidably movable carrier arm is positioned within the housing in selective biased operative engagement with the linear potentiometer spring biased contact pin so as to cause a gaging electrical signal generating movement of the contact pin within the linear potentiometer in response to corresponding movement of the carrier arm.

At least one part-engaging contact member is fixedly provided on the carrier arm so as to extend outwardly from the housing. The biased carrier arm is slidably movable in response to the spring-biased contact pin so as to move the part-engaging contact member into gaging contact with a part positioned proximate thereto.

A movable retractor handle means is provided externally of the gage housing. The movable retractor handle means is fixedly attached to the carrier arm so as to selectively retract the biased part-engaging contact member during installation of the gage housing in its gaging position on a fixture rail.

Means are provided in association with the linear potentiometer so as to transmit the gaging electrical signal generated by movement of the linear potentiometer contact pin within the linear potentiometer to an associated data collector.

In some embodiments of the contour and outline transducer gage assembly, the fixture rail-engaging means comprise at least one outwardly extending locator peg provided on the housing. The locator peg adapted to matingly engage a bushing provided on a fixture rail. Another embodiment of the locator peg is provided with a longitudinal expansion slot therethrough so as to adapt the locator peg for locking snap engagement with a fixture rail bushing.

One contour and outline transducer gage assembly is provided with at least one flexible plastic locking clamp in parallel spaced-apart relationship to the locator peg so as to cooperate with the locator peg to make snap locking engagement with a bushing provided on a fixture rail.

Another embodiment of the contour and outline transducer gage assembly is provided with lash adjustment means in association with the carrier arm so as to impart lash adjustment capability thereto within the gage housing.

In another embodiment of the contour and outline transducer gage assembly, the movable retractor handle member consists of an external retractor cover plate fixedly attached to the carrier arm.

Another embodiment of the contour and outline transducer gage assembly is provided for selective mounting upon a fixture rail for selectively making outline (gap) and contour checks with respect to a part positioned proximate thereto which comprises a transducer gage housing. An outline check locator peg is provided on the gage housing so as to extend outwardly therefrom. The outline locator peg is adapted to selectively engage a fixture rail bushing so as to selectively maintain the transducer gage housing in its outline check position on a fixture rail. A contour check locator peg is provided on the gage housing so as to extend outwardly therefrom. The contour locator peg is adapted to selectively engage a fixture rail bushing so as to selectively maintain the transducer gage housing in its contour check position on a fixture rail.

A linear potentiometer is fixedly positioned within the housing. The linear potentiometer has a spring biased linear potentiometer contact pin extending outwardly therefrom.

A slidably movable carrier arm is positioned within the housing in selective biased operative engagement with the linear potentiometer spring biased contact pin so as to cause a gaging electrical signal generating movement of the contact pin within the linear potentiometer in response to correspondent movement of the carrier arm.

An outline check finger is fixedly provided on the carrier arm so as to extend outwardly from the gage housing in parallel spaced-apart relationship to the outline check locator peg. The outline check finger is adapted to move into biased gaging contact with a part positioned proximate thereto upon corresponding biased movement of the biased carrier arm.

A contour check pin is fixedly provided on the carrier arm so as to extend outwardly from the gage housing in parallel spaced-apart relationship to the contour check locator peg. The contour check pin is adapted to move into biased gaging contact with a part positioned proximate thereto upon corresponding biased movement of the biased carrier arm.

Means are provided in association with the linear potentiometer so as to transmit the gaging electrical signal generated by movement of the contact pin within the linear potentiometer to an associated data collector.

A gage is provided which has biased fixture rail-engaging means for selectively mounting a gage in operative use snap engagement with a fixture rail. The gage includes a gage housing which has at least one fixed rigid locator peg provided on the housing so as to extend outwardly therefrom. The fixed rigid locator peg is adapted to matingly engage a corresponding rigid locator peg receiving hole provided in a fixture rail.

At least one spring biased locator peg is provided on the housing so as to extend outwardly therefrom in a substantially parallel spaced-apart relationship to the fixed rigid locator peg. The spring biased locator peg is adapted to matingly engage a corresponding spring biased locator peg receiving hole provided in a fixture rail. The spring biased locator peg and the fixed rigid locator peg cooperate to make a spring biased snap lock engagement with the corresponding locator peg receiving holes in the fixture rail so as to maintain the gage in its operative use position on the fixture rail.

A fixture rail mount block is provided and adapted for universally adjustable mounting on a fixture rail so as to selectively receivably maintain a contour and outline transducer gage in its proper operative use position on the fixture rail. The fixture rail mount block is adapted for adjustable mounting on a fixture rail. The rail mount block is provided with spaced-apart fixture rail contact members extending downwardly therefrom.

A forward enlarged cap screw receiving hole is provided vertically through the mount block. A rear enlarged cap screw receiving hole is provided vertically through the mount block. The rear enlarged cap screw receiving hole is parallel to and longitudinally spaced-apart from the forward cap screw receiving hole.

A forward vertically oriented jack post bolt receiving hole is provided in the bottom surface of the rail mount block in longitudinally aligned open communication with the forward cap screw receiving hole. A rear vertically oriented jack post bolt receiving hole is provided in the bottom surface of the rail mount block in longitudinally aligned open communication with the rear cap screw receiving hole.

A pair of elongate cap screws are provided for selective free insertion through the corresponding forward and rear cap screw receiving holes provided through the rail mount block into selective threaded engagement with corresponding vertically adjustable spaced-apart jack post bolts provided in a fixture rail. The cap screw receiving holes and the jack post bolt receiving hole are of a larger diameter than the diameter of the cap screws and the jack post bolts positioned respectively therethrough so as to permit selectively adjustable movement of the rail mount block in relation thereto. The elongate cap screw are adapted to cooperate with the jack post bolts to impart a pitch adjustment capability to the rail mount block. The cap screws are adapted to adjustably lock the rail mount block in its operative use position on the fixture rail.

A pair of transversely oriented roll-adjusting set screw receiving threaded holes are vertically provided through the rail mount block. The set screw receiving threaded holes are threadably provided with roll-adjusting set screws therein which are adapted to selectively adjustably engage the fixture rail so as to provide a roll-adjustment capability to the rail mount block in relation to the fixture rail upon which it is mounted.

A pair of transversely oriented roll lock pin receiving holes are vertically provided through the rail mount block. The roll lock pin receiving holes are adapted to selectively receive a plastic setting glue therethrough into the interior of the rail mount block so as to selectively lockably fix the rail mount block into its finally adjusted position on the fixture rail. The roll lock pin receiving holes are adapted to lockably receive roll lock pins therein so as to lock the rail mount block into its finally adjusted glued position on the fixture rail.

A gage locator peg receiving hole is provided in the upper surface of the rail mount block. The gage locator peg receiving hole is adapted to operatively receive a simulated gage locator peg of a ball gage check assembly therein so as to maintain the ball gage check assembly in its operative use check position on the rail mount block while the rail mount block is being adjusted to its final operative use position on the fixture rail.

Another embodiment of a hand held contour and outline transducer gage assembly is provided for selective mounting upon a fixture rail for selectively making outline (gap) and contour checks with respect to a part positioned proximate thereto. The hand held gage assembly comprises a transducer gage housing. The transducer gage housing is provided with at least one pair of spaced-apart fixture rail positioning downwardly extending locator pins which are adapted to engage the vertical edge surface of a fixture rail so as to maintain the gage housing in its operative use gaging position upon a fixture rail.

A linear potentiometer is fixedly positioned within the housing. The linear potentiometer has a spring biased linear potentiometer contact pin extending outwardly therefrom.

A slidable movable carrier arm is positioned within the housing in selective biased operative engagement with the linear potentiometer spring biased contact pin so as to cause a gaging electrical signal generating movement of the contact pin within the linear potentiometer in response to corresponding movement of the carrier arm.

At least one part-engaging contact member is fixedly provided on the carrier arm so as to extend outwardly from the housing. The biased carrier arm is slidably movable in response to the spring-biased contact pin so as to move the part-engaging contact member into gaging contact with a part positioned proximate thereto.

Movable retractor handle means are provided externally of the gage housing. The movable retractor handle means are fixedly attached to the carrier arm so as to selectively retract the biased part-engaging contact member during installation of the gage housing into its gaging position on a fixture rail.

Means are provided in association with the linear potentiometer so as to transmit the gaging electrical signal generated by movement of the linear potentiometer contact pin within the linear potentiometer to an associated data collector.

An adjusted contour check pin support assembly is provided in operative engagement with a contour and outline transducer gage assembly.

The transducer gage housing is provided with an external movable cover plate fixedly attached to a movable carrier arm provided within the gage housing.

A contour check pin support member is provided on the movable cover plate. The contour check pin support member is vertically adjustable along a vertical support pin extending upwardly from the cover plate through the contour check pin support member.

A vertically oriented angularity adjustment pin is provided which extends upwardly from the cover plate in operative adjustment engagement with the contour check pin support member. The angularity adjustment pin is in parallel spaced-apart relationship to the vertical support pin.

Adjustment means are provided in association with the angularity adjustment pin and the contour check pin support member so as to selectively rotatably adjust the contour check pin support member about the vertical support pin.

Various other modifications of the invention may be made without departing from the principle thereof. Each of the modifications is to be considered as included in the hereinafter appended claims, unless these claims by their language expressly provide otherwise.

I claim:

1. In an adjustable contour check pin support assembly provided in operative engagement with a contour and outline transducer gage assembly comprising:

a transducer gage housing, said transducer gage housing provided with an external movable cover plate fixedly attached to a movable carrier arm provided within said gage housing;

a contour check pin support member provided on said movable cover plate, said contour check pin support member vertically adjustable along a vertical support pin extending upwardly from said cover plate through said contour check pin support member;

a vertically oriented angularity adjustment pin extending upwardly from said cover plate in operative adjustment engagement with said contour check pin support member, said angularity adjustment pin being in parallel spaced-apart relationship to said vertical support pin; and adjustment means in association with said angularity adjustment pin and said contour check pin support member so as to selectively rotatably adjust said contour check pin support member about said vertical support pin.

* * * * *